US008509576B2

(12) United States Patent
Ohta et al.

(10) Patent No.: US 8,509,576 B2
(45) Date of Patent: Aug. 13, 2013

(54) OPTICAL SWITCH, IMAGE DISPLAY DEVICE, IMAGE FORMING DEVICE, AND METHOD FOR MANUFACTURING OPTICAL SWITCH

(75) Inventors: Masahiko Ohta, Tokyo (JP); Osamu Ishibashi, Tokyo (JP); Fujio Okumura, Tokyo (JP)

(73) Assignee: NEC Corporation, Tokyo (JP)

( * ) Notice: Subject to any disclaimer, the term of this patent is extended or adjusted under 35 U.S.C. 154(b) by 147 days.

(21) Appl. No.: 13/139,457

(22) PCT Filed: Dec. 14, 2009

(86) PCT No.: PCT/JP2009/070821
§ 371 (c)(1),
(2), (4) Date: Jun. 13, 2011

(87) PCT Pub. No.: WO2010/071105
PCT Pub. Date: Jun. 24, 2010

(65) Prior Publication Data
US 2011/0243497 A1    Oct. 6, 2011

(30) Foreign Application Priority Data

Dec. 18, 2008 (JP) ................. 2008-322726

(51) Int. Cl.
*G02B 6/35* (2006.01)
*G02F 1/295* (2006.01)
(52) U.S. Cl.
USPC ................... 385/16; 385/8; 359/245
(58) Field of Classification Search
USPC ............................ 385/16; 359/245
See application file for complete search history.

(56) References Cited

U.S. PATENT DOCUMENTS
5,153,770 A    10/1992    Harris

FOREIGN PATENT DOCUMENTS

| JP | 57-094726 | 6/1982 |
|---|---|---|
| JP | 01-149015 | 6/1989 |
| JP | 01-149024 | 6/1989 |
| JP | 2-287425 | 11/1990 |
| JP | 04-242728 | 8/1992 |
| JP | 05-188336 | 7/1993 |
| JP | 2666805 | 6/1997 |
| JP | 2003-287727 | 10/2003 |

OTHER PUBLICATIONS

English translation of Japanese document No. JP 01-149024 provided by Phoenix Translations on Dec. 2012.*
International Search Report, PCT/JP2009/070821, Jan. 12, 2010.

* cited by examiner

*Primary Examiner* — Omar Rojas
(74) *Attorney, Agent, or Firm* — Young & Thompson

(57) ABSTRACT

An optical switch includes electro-optic crystal, and electrode unit including a plurality of electrodes arranged on the same plane in electro-optic crystal to extend in parallel to one another. A refractive index of a part of electro-optic crystal is changed by an electric field generated at electrode unit, thereby switching transmission and reflection of light incident on electro-optic crystal. Electro-optic crystal has an entrance surface through which light enters and an exit surface from which light exits. Electrode unit is located between the entrance surface and the exit surface. An angle $\theta x$ formed between a longitudinal direction of electrodes and at least one surface from among the entrance surface and the exit surface is set near an angle that satisfies the expression $\theta x = 90° - \sin^{-1}[\cos(\tan^{-1}(n))]$ in a wavelength of light to be modulated.

20 Claims, 14 Drawing Sheets

OPTICAL SWITCH, IMAGE DISPLAY DEVICE, IMAGE FORMING DEVICE, AND METHOD FOR MANUFACTURING OPTICAL SWITCH

TECHNICAL FIELD

The present invention relates to an optical switch for switching a state of light between transmission and reflection, an image display device that uses the optical switch, an image forming device, and a method for manufacturing the optical switch.

BACKGROUND ART

An optical modulator used for display optical modulation must have sufficient resistance (hereinafter, optical resistance) to optical damage, for example, because optical modulation is performed for high-output light of 100 milliwats or more.

In order to obtain the optical resistance, in principle, an acousto-optic modulation element may be used, which can modulate an optical beam of a relatively large diameter (beam diameter is about several tens of micrometers to several hundreds of micrometers).

Patent Literature 1 describes an acousto-optic element. FIGS. 1A and 1B show a configuration of the acousto-optic element. The acousto-optic element modulates light by changing a refractive index in acousto-optic crystal 10 based on an acoustic wave transmitted through acousto-optic crystal 10 to cause Bragg diffraction. The configuration described in Patent Literature 1 employs a method for reducing, without forming any antireflection film having low optical resistance, a reflection component of the light by entering the light into acousto-optic crystal 10 at a Brewster's angle. Specifically, the acousto-optic element has incident surface 11 and exit surface 12 of light formed in parallel to each other. In the acousto-optic element, a center line of electrode 13a having piezoelectric element 13 almost matches the traveling direction of the light so that light incident on entrance surface 11 at the Brewster's angle can be effectively diffracted by an ultrasonic wave traveling through acousto-optic crystal 10.

There have been proposed many optical switches for performing light switching by applying an electric field to a crystal having an electro-optic effect (hereinafter, electro-optic crystal) to cause a change in refractive index. For display optical modulation, for the abovementioned reason, the preferred way is that an optical switch capable of modulating an optical beam having a relatively large beam diameter and having high optical resistance be provided.

Patent Literature 2 describes an optical switch that uses Bragg reflection. FIG. 2 shows a configuration of the optical switch.

As shown in FIG. 2, the optical switch includes optical waveguide layer 21 having an electro-optic effect, and first and second electrode groups 31 and 32 located in optical waveguide layer 21. Each of first and second electrode groups 31 and 32 includes a plurality of plate-shaped electrodes 30 extending in parallel to a thickness direction of optical waveguide layer 21. Plate-shaped electrodes 30 are arranged at equal intervals. A section of a plane of each of first and second electrode groups 31 and 32 intersecting the thickness direction of optical waveguide layer 21 is formed into a comb shape, and plate-shaped electrodes 30 equivalent to teeth of the combs are alternately arranged.

In the abovementioned optical switch, applying a voltage between first and second electrode groups 31 and 32 causes a change in the refractive index in the area between adjacent plate-shaped electrodes 30. As a result, a cyclic refractive index change occurs in optical waveguide layer 21. A portion where the cyclic refractive index change occurs functions as a diffraction grating, and incident light is subjected to Bragg diffraction. On the other hand, when application of the voltage to first and second electrode groups 31 and 32 is stopped, the portion stops functioning as the diffraction grating, and hence the incident light is transmitted through an area between plate-shaped electrodes 30. The electro-optic element of this structure allows free selection of a thickness of optical waveguide layer 21 through which the light is guided. Thus, even an optical beam of a relatively large beam diameter can be modulated, and high optical resistance can be achieved.

CITATION LIST

Patent Literature

[Patent Literature 1] JP1-149015A
[Patent Literature 2] U.S. Pat. No. 2,666,805 (JP1-214827A)

SUMMARY OF INVENTION

Technical Problem

The preferred way is that a bulk optical switch capable of modulating an optical beam of a relatively large beam diameter and having high optical resistance be miniaturized, and power consumption be reduced.

However, in the acousto-optic element described in Patent Literature 1, in order to generate efficient Bragg diffraction as the acousto-optic element, the electrodes must be formed with lengths of 2 millimeters to 3 millimeters or more. Thus, when the electrodes have short lengths, sufficient diffraction efficiency cannot be obtained, and hence it is difficult to miniaturize the element. Because of the characteristics of the acousto-optic element, as a modulation signal to be applied to the electrodes, for example, a signal obtained by amplitude-modulating a high-frequency signal of 200 megahertz must be applied to the electrodes. In consequence, the circuit for an operation becomes complex, and a large amount of power is necessary to operate the circuit, increasing power consumption in the element as a whole.

The optical switch described in Patent Literature 2 can be miniaturized. However, this optical switch is configured by burying the plurality of plate-shaped electrodes that occupy a large area in the electro-optic crystal having a high dielectric constant, and hence a capacity among the electrodes is large. In consequence, it is very difficult to reduce power consumption.

It is therefore an object of the present invention to provide an optical switch using an electro-optic crystal, which can solve the abovementioned problems. Other objects of the present invention are to provide a method for manufacturing the optical switch capable of solving the problems, an image display device using the optical switch, and an image forming device.

Solution to Problem

In order to achieve the abovementioned object, an optical switch according to the present invention includes: an electro-optic crystal; and an electrode unit having a plurality of electrodes arranged on the same plane in the electro-optic crystal to extend in parallel to one another. The optical switch changes the refractive index of a part of the electro-optic crystal by an electric field generated at the electrode unit, thereby switching transmission and reflection of light incident on the electro-optic crystal. The electro-optic crystal has an entrance surface through which light enters and an exit surface from which light exits, the electrode unit is located between the entrance surface and the exit surface. An angle θx formed between a longitudinal direction of the electrodes and at least one of the entrance surface and the exit surface is set near an angle that satisfies the following expression (1):

$$\theta x = 90° - \sin^{-1}[\cos(\tan^{-1}(n))] \quad (1)$$

(n denotes a refractive index of the electro-optic crystal in a wavelength of light to be modulated).

An image display device according to the present invention includes: a light source; an optical switch of the present invention for modulating light from the light source; scanning means for scanning an external projection surface with an optical beam modulated by the optical switch; and a control unit for controlling a modulation operation of the optical switch based on a control signal input from the outside.

An image forming device according to the present invention includes: a light source; a photosensitive body; an optical switch of the present invention for modulating light from the light source; scanning means for scanning the photosensitive body with an optical beam modulated by the optical switch; and a control unit for controlling a modulation operation of the optical switch based on a control signal input from the outside.

A method for manufacturing an optical switch according to the present invention is provided. The optical switch includes an electro-optic crystal, and an electrode unit having a plurality of electrodes arranged on the same plane in the electro-optic crystal to extend in parallel to one another, and changes the refractive index of a part of the electro-optic crystal by an electric field generated at the electrode unit, thereby switching transmission and reflection of light incident on the electro-optic crystal. The method includes the step of: forming the plurality of electrodes on the same plane of the electro-optic crystal at an inclination by setting an angle θx formed between an end surface of the electro-optic crystal and a longitudinal direction of the electrodes near an angle that satisfies the following expression (1):

$$\theta x = 90° - \sin^{-1}[\cos(\tan^{-1}(n))] \quad (1)$$

(n denotes the refractive index of the electro-optic crystal in a wavelength of light to be modulated).

Another method for manufacturing an optical switch according to the present invention is provided. The optical switch includes an electro-optic crystal, and an electrode unit having a plurality of electrodes arranged on the same plane in the electro-optic crystal to extend in parallel to one another, and changes the refractive index of a part of the electro-optic crystal by an electric field generated at the electrode unit, thereby switching transmission and reflection of light incident on the electro-optic crystal. The method includes the steps of: forming the plurality of electrodes on the same plane of the electro-optic crystal by setting a longitudinal direction of the electrodes orthogonal to an end surface of the electro-optic crystal; and cutting the electro-optic crystal having the plurality of electrodes along a cut surface. In the cutting step, an angle θx of the cut surface to the longitudinal direction of the electrodes is set near an angle that satisfies the following expression (1):

$$\theta x = 90° - \sin^{-1}[\cos(\tan^{-1}(n))] \quad (1)$$

(n denotes the refractive index of the electro-optic crystal in a wavelength of light to be modulated).

Advantageous Effects of Invention

According to the present invention, a large refractive index change can be obtained by a low operation voltage. Thus, power consumption can be reduced. According to the present invention, a switching operation can be performed for an optical beam having a relatively large diameter. Thus, high optical resistance can be achieved. According to the present invention, the switching operation can be performed only by applying a voltage to the electrode unit. Thus, the circuit for the switching operation can be simplified, and the configuration can be simplified.

BRIEF DESCRIPTION OF DRAWINGS

FIG. 3B0 A sectional view showing, in the section shown in FIG. 3B, an angle θx formed between an entrance surface of an electro-optic crystal and a longitudinal direction of the electrodes and a Brewster's angle θb formed between an optical axis of light incident through the entrance surface and a normal direction of the entrance surface.

FIG. 3C0 A sectional view showing a critical angle θm and an incident angle θa to the electro-optic crystal in the optical switch shown in FIG. 3C.

FIG. 7B0 A plan view showing a mask shape.

FIG. 7C0 A plan view showing a pattern formed by using the mask shown in FIG. 7B0.

DESCRIPTION OF EMBODIMENTS

Hereinafter, embodiments of the present invention are described with reference to the drawings.

Figure 3A:
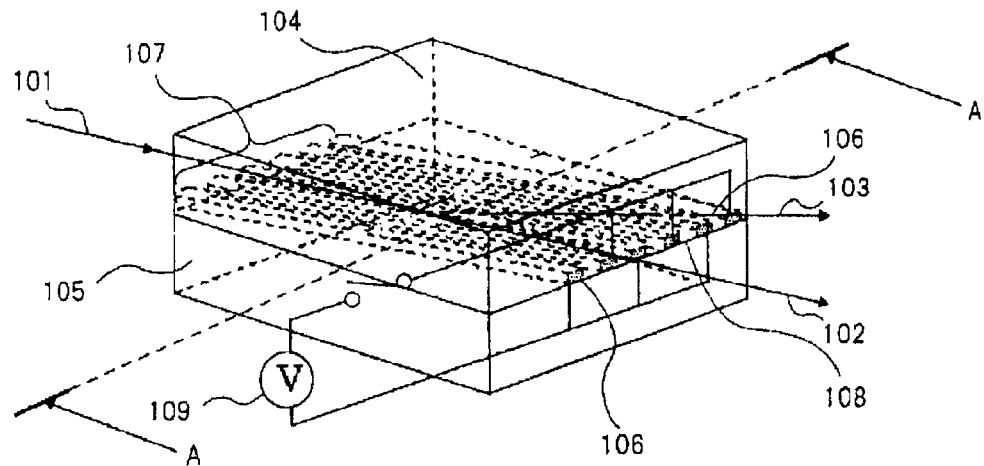
FIG. 3A A schematic view showing a configuration of an optical switch according to an embodiment.
Figure 3B:
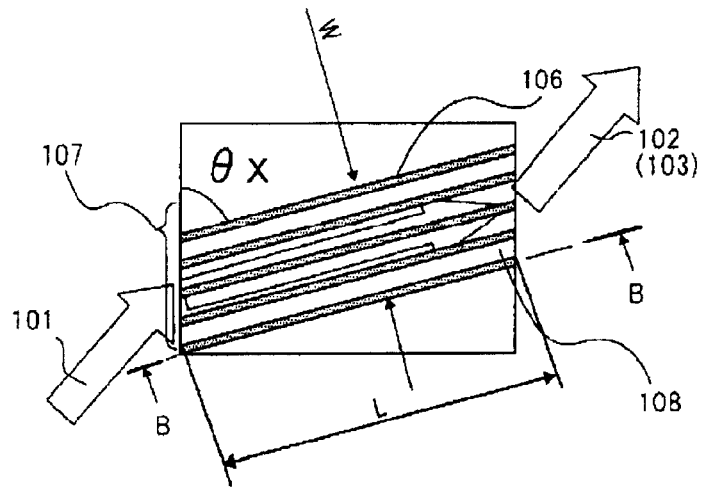
FIG. 3B A sectional view showing the optical switch shown in FIG. 3A on a plane parallel to an arranging direction of electrodes.
Figure 3B:
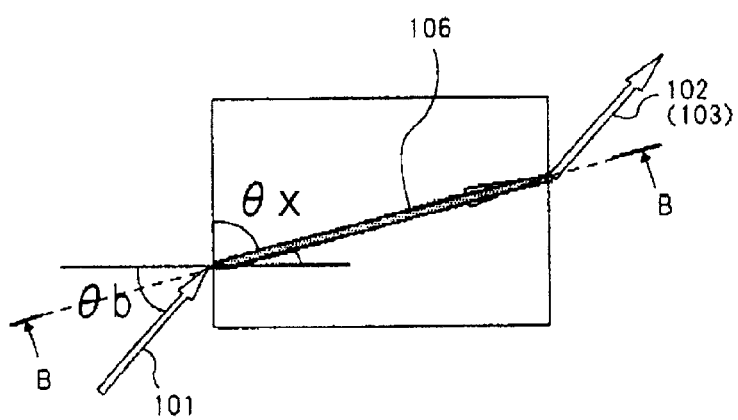
Figure 3C:
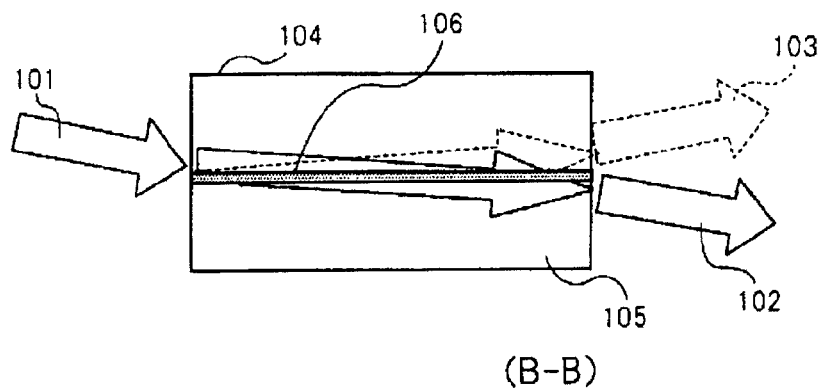
FIG. 3C A sectional view on a plane including an axis of the longitudinal direction of the electrodes in the optical switch shown in FIG. 3A.
Figure 3C:
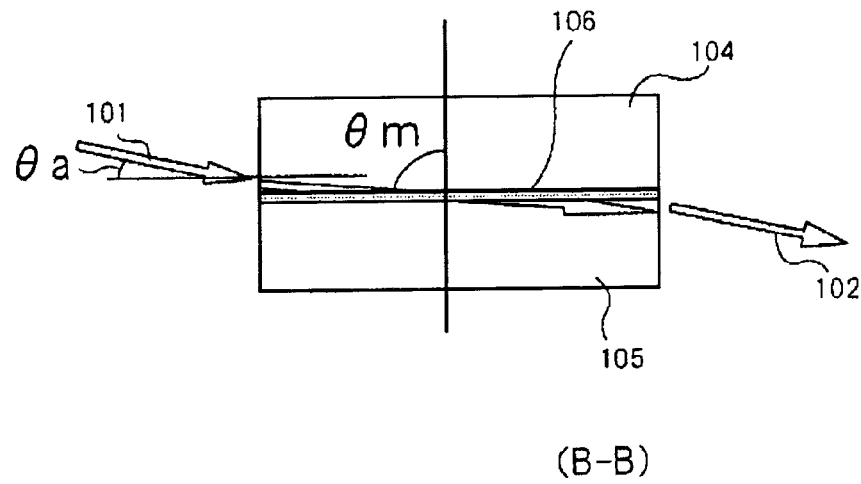

FIG. 3A is a schematic view showing a configuration of an optical switch according to an embodiment. FIG. 3B is a sectional view showing the optical switch shown in FIG. 3A on a plane parallel to the arranging direction of electrodes. FIG. 3C is a sectional view showing a plane including an axis parallel to a longitudinal direction of electrodes 106.

As shown in FIG. 3A, the optical switch is configured by joining first electro-optic crystal 104 and second electro-optic crystal 105, for example, under conditions of a high temperature and high pressure. As shown in FIG. 3B, in the joined electro-optic crystal, refractive indexes are almost equal and continuous on joined boundary surfaces of electro-optic crystal 104 and electro-optic crystal 105, and hence these crystals can be regarded as one optically uniform electro-optic crystal.

Electro-optic crystals 104 and 105 are crystals such as potassium tantalate niobate (KTN) or lithium niobate (LN) having an electro-optic effect.

A plurality of grooves are formed to be parallel to one another on a surface (surface joined to electro-optic crystal 105) of electro-optic crystal 104 before joining, and electrode 106 is formed in each groove. Electrode 106 is formed, for example, by depositing an electron conductor that becomes an electrode component in the bottom of the groove. A portion of the surface of electro-optical crystal 104 other than the grooves is sufficiently polished to form a flat surface.

A surface of electro-optic crystal 105 before joining is sufficiently polished to form a flat surface. This surface is joined to the surface of electro-optic crystal 104 where above-mentioned electrodes 106 are formed. In a joined state, electrode unit 107 that includes the plurality of electrodes 106 is formed in electro-optic crystal 105. Electro-optic crystals 104 and 105 can be bonded by a binder or the like having a refractive index equal to those of electro-optic crystals 104 and 105.

The plurality of electrodes 106 are arranged to extend almost in parallel to one another on the same plane in the electro-optic crystal, and formed to be linear as the electrodes. Electrode unit 107 has its principal section whose area becomes the largest, namely, a section parallel to the arranging direction of the electrodes, located in the same plane.

The plurality of electrodes 106 is electrically connected to external power source 109 so that the polarities of adjacent electrodes 106 are different from each other. Thus, among electrodes 106 of electrode unit 107, voltages of different polarities are applied to adjacent electrodes 106.

Each electrode 106 extends toward the other end surface of the electro-optic crystal so that an angle θx formed between one end surface of the joined electro-optical crystal and the longitudinal direction of electrode 106 can be set near an angle satisfying the following expression (1). In the embodiment, one end surface is an entrance surface, and the other end surface is an exit surface.

$$\theta x = 90° \mathrm{Sin}^{-1}[\cos(\mathrm{Tan}^{-1}(n))] \quad (1)$$

In the expression, n denotes a refractive index of the electro-optic crystal in a wavelength of incident light. The same plane is not limited to a completely geometrically identical plane, but includes a manufacturing error. This plane is only required to be set within a range where in a refractive index change portion described below, a refractive index interface between a refractive index changed area and its surrounding area has a flat surface parallel to the arranging direction of the plurality of electrodes 106.

Next, an operation of the optical switch according to the embodiment is described.

When the optical switch of the embodiment is used, as shown in FIG. 3B, light enters the entrance surface so that an angle formed between an optical axis of the light incident on the entrance surface of the electro-optic crystal and a normal direction of the entrance surface can be set near an angle satisfying a Brewster's angle θb described below:

$$\tan \theta_b = n \quad (2)$$

The following expression (3) is calculated from this expression (2):

$$\theta_b = \operatorname{Tan}^{-1}(n) \quad (3)$$

In the expression, n denotes the refractive index of the electro-optic crystal in a wavelength of the incident light. By having the light enter the electro-optic crystal at this incident angle, the longitudinal direction of electrodes 106 formed in the electro-optic crystal and the traveling direction of the light in the electro-optic crystal can be set almost parallel to each other.

Figure 4A:
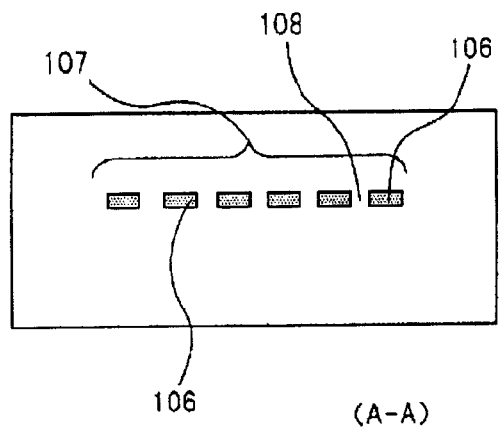
FIG. 4A A sectional view cut along a line A-A on a plane almost orthogonal to the longitudinal direction of the electrodes shown in FIG. 3A.

FIG. 4A is a sectional view on a plane almost orthogonal to the longitudinal direction of each electrode 106. When no voltage is applied to electrode unit 107, as shown in FIG. 4A, no change occurs in refractive index in the crystal area near electrode 106. In this state, when incident light 101 enters from the entrance surface of the electro-optic crystal, incident light 101 is transmitted through interval area 108 (hereinafter, light transmission unit 108) between the electrodes, and exits as transmitted light 102 from the exit surface to the outside.

Figure 4B:
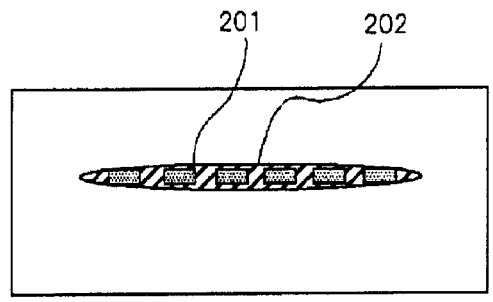
FIG. 4B A schematic view showing a refractive index change portion in the optical switch shown in FIG. 3A.

On the other hand, when voltage is applied to electrode unit 107, as shown in FIG. 4B, a change occurs in the refractive index due to an electric field from electrode 106 in the crystal area near electrode 106. Refractive index change portion 201 is accordingly generated in the crystal area near electrode 106. Refractive index change portion 201 surrounds entire electrode unit 107. Refractive index interface 202 between a refractive index changed area of refractive index change portion 201 and a crystal area around the changed area has a flat surface parallel to the arranging direction of the plurality of electrodes 106.

In refractive index interface 202, a critical angle θm that becomes a condition of total reflection of incident light 101 is calculated by the following expression (4) based on the relationship between the refractive index change amount Δn of refractive index change portion 112 and refractive indexes n0 of electro-optic crystals 104 and 105:

$$\theta_m = \operatorname{Sin}^{-1}\left\{\frac{(\Delta n + n_0)}{n_0}\right\} \quad (4)$$

Incident light having an incident angle equal to or more than the critical angle θm is totally reflected by refractive index interface 202, and exits as reflected light 103 from the exit surface to the outside. In this case, the exit direction of reflected light 103 becomes an exit direction of transmitted light 102.

As described above, controlling a voltage applied to electrode unit 107 enables switching between a transmission state and a reflection state. Thus, the on and off states of light can be controlled. Transmitted light 102 and reflected light 103 can be easily separated because of the different exit directions.

As shown in FIG. 3C0, when incident light having an incident angle equal to or more than the critical angle θm enters from the entrance surface of the electro-optic crystal, the incident light must enter at an incident angle smaller than an angle θa that satisfies the following expression (5):

$$\theta_a = \operatorname{Sin}^{-1}(n^* \cos \theta_m) \quad (5)$$

Figure 5A:
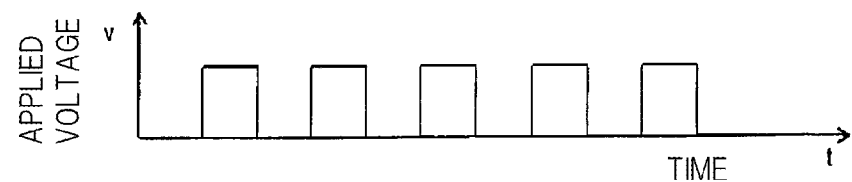
FIG. 5A A view showing an applied voltage change in the optical switch shown in FIG. 3A.
Figure 5B:
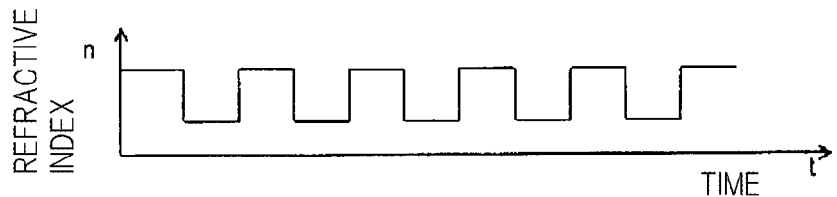
FIG. 5B A view showing a refractive index change in the optical switch shown in FIG. 3A.
Figure 5C:
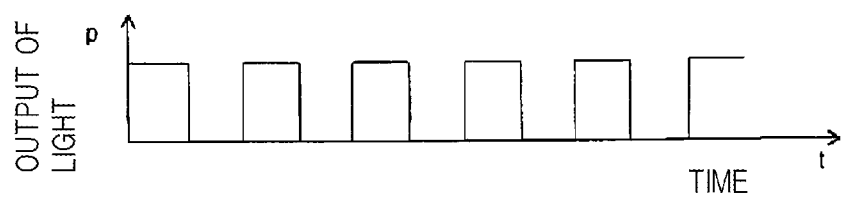
FIG. 5C A view showing a light output change in the optical switch shown in FIG. 3A.

FIGS. 5A to 5C show changes in refractive index and light output with respect to an applied voltage in the optical switch according to the embodiment. FIG. 5A shows a waveform of the applied voltage, a horizontal axis indicating time, and a vertical axis indicating a voltage. FIG. 5B shows a change in refractive index near the electrode unit with respect to the applied voltage shown in FIG. 5A, a horizontal axis indicating time, and a vertical axis indicating a refractive index. FIG. 5C shows a change in light output with respect to the applied voltage shown in FIG. 5A, a horizontal axis indicating time, and a vertical axis indicating a light output. A value of the light output is a value when transmitted light 102 is detected by using a photodetector or the like.

When a voltage is applied to electrode unit 107, the refractive index of an area near electrode 106 is smaller than that of another area around this area. Thus, light incident on refractive index interface 202 at an incident angle equal to or more than the critical angle θm is totally reflected on refractive index interface 202, and the output value of transmitted light 102 detected by the photodetector is small.

When a voltage value applied to electrode unit 107 is zero, no change occurs in refractive index in the area near electrode 106. Thus, incident light 101 is directly transmitted through light transmission unit 108 between electrodes 106, and is detected by the photodetector. An output value of transmitted light 102 is larger than that when the voltage is applied.

Next, effects obtained by using the embodiment are described.

Generally, when light enters a crystal such as an electro-optic crystal having a relatively large refractive index, the reflection component of the light becomes large. However, the reflection component of the light can be reduced by having the light enter or exit to or from the crystal at a Brewster's angle θb.

Figure 6:
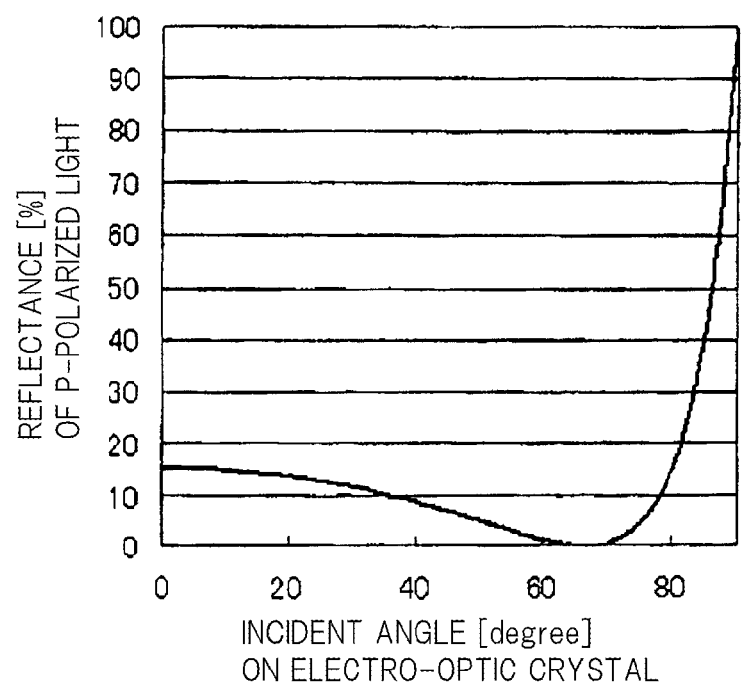
FIG. 6 A view showing a relationship between an incident angle and a reflectance when P-polarized light enters the electro-optical crystal.

As an example, FIG. 6 shows the relationship between an incident angle (degree) to the electro-optic crystal of a refractive index 2.3 and a reflectance of P-polarized light. As shown in FIG. 6, by having the P-polarized light or at least light containing a P-polarized light component enter at a Brewster's angle θb, a reflection component when the light enters a boundary having a refractive index difference can be greatly reduced.

In the electro-optic crystal, when the entrance surface and the exit surface of the light are almost parallel to each other, light emitted from the electro-optic crystal can also exit again at a Brewster's angle θb. Thus, as in the case of having the light enter the entrance surface, the reflection component of the light emitted from the exit surface can be greatly reduced. As a result, the optical switch of the embodiment can enable light to enter and to exit with little reflection, and can improve light utilization efficiency. Moreover, according to the optical switch, it is not necessary to provide any antireflection film, thus reducing manufacturing costs.

Causing the light to enter the electro-optic crystal at the Brewster's angle θb enables setting of the longitudinal direction of electrode 106 formed in the electro-optic crystal and the traveling direction of the light in the electro-optic crystal almost parallel to each other. In the configuration where the traveling direction of incident light 101 and the longitudinal direction of electrode 106 intersect each other, the light is blocked due to the thickness of electrode 106 or the like to reduce light utilization efficiency. However, the structure of the embodiment enables a reduction in light loss, thereby preventing reduction of light utilization efficiency.

The optical switch of the embodiment is a bulk optical switch that needs no waveguide structure and enables transmission of light in the electro-optic crystal 104. The optical switch of the embodiment can accordingly switch an optical beam having a diameter (several tens of micrometers to several hundreds of micrometers) relatively larger than that of the waveguide optical switch. As a result, intensity of light applied per unit area can be lowered, and optical resistance can be increased more than that in the case of the waveguide optical switch.

The angle at which the light enters the entrance surface of the electro-optic crystal is a Brewster's angle θb. Thus, when a beam width (as shown in FIG. 3B, diameter on the plane parallel to the arranging direction of the plurality of electrodes) of an optical beam is l before entering the electro-optic crystal from the entrance surface of the electro-optic crystal, the beam width of the optical beam in the electro-optic crystal is widened to l/cos θb, namely, l/cos θ(Tan$^{-1}$(n)). As a result, according to the embodiment, the amount of damage caused by entry of intense light to the electro-optic crystal can be reduced, and hence resistance (optical resistance) to optical damage can be increased, and reliability can be improved.

A relationship among power consumption P, applied voltage V, interelectrode capacity C, and maximum modulation operating frequency fmax during a high-speed operation of the optical switch of the embodiment is represented by the following expression (6) group:

$$\begin{cases} P \propto fCV^2 \\ f_{max} = \dfrac{1}{\pi RC} \\ E = \dfrac{V}{d} \end{cases} \quad (6)$$

In the expression, f denotes an operating frequency, R denotes output resistance, and d denotes an electrode interval.

The expression (6) group shows that when voltage V is applied between the electrodes, the relationship between electrode interval d and electric field intensity E generated between the electrodes is inversely proportional. According to this relationship, in the optical switch of the embodiment, the plurality of electrodes 106 are arranged at equal intervals of several micrometers to several tens of micrometers, which are relatively narrow. Thus, by a relatively small applied voltage V, a more intense electric field can be generated to form a refractive index change portion in light transmission unit 108 between electrodes 106. As a result, voltage V applied to the electrode unit can be lowered. A sectional area of the plurality of electrodes 106 is relatively small, and hence the interelectrode capacity C can be reduced.

According to the expression (6) group, power consumption P during the high-speed operation is proportional to the square of applied voltage V and interelectrode capacity C. The power consumption can accordingly be reduced by lowering applied voltage V and interelectrode capacity C. The operating frequency fmax is inversely proportional to interelectrode capacity C. Thus, by reducing electrode capacity C, the operating frequency fmax can be increased. In other words, a high speed can be achieved for the switching operation.

As described above, according to the optical switch of the embodiment, by reducing losses, high light utilization efficiency can be achieved, high reliability can be obtained because of high optical resistance, power consumption can be reduced, and a high speed can be achieved for the switching operation.

Next, materials desirable for the respective units of the optical switch of the embodiment, and desirable setting conditions on electrode length and the like are described.

In the optical switch of the embodiment, as the electro-optic crystal, an electro-optic crystal relatively high in Kerr constant, Pockels constant, and refractive constant, for example, potassium tantalate niobate (KTN), lithium niobate (LiNbO$_3$), LiTaO$_3$(Lt), or KTiOPO$_4$(KTP), is desirably used. This is because since a refractive index amount Δn satisfies the following expression (7), a large refractive index change Δn can be obtained by using the electro-optic crystal relatively high in Kerr constant, Pockels constant, and refractive index.

$$\Delta n = -\frac{1}{2}n_0^3 r_{33} E - \frac{1}{2}n_0^3 s E^2 \quad (7)$$

The interelectrode interval can be further reduced by optimizing lengths of electrodes 106 according to the size of the optical beam of incident light 101.

Specifically, a length L of electrode 106 in FIG. 3B only needs to be set so that all optical beams traveling through the electro-optic crystal can be transmitted through light transmission unit 108 of the electro-optic crystal present between electrodes 106. In other words, as shown in FIG. 3C, the electro-optical crystal is seen on a plane which is orthogonal to the arranging direction of electrodes 106 and which includes an axis of the longitudinal direction of electrodes 106. When seen on this plane, an optical beam has beam diameter r in the electro-optic crystal, and critical angle θm in the electro-optic crystal is set as a total reflection condition on a refractive index interface between a change area where a refractive index is changed by an electric field from the electrode unit and an area around this change area. In this case, electrode length L that is a length of electrode 106 is only required to be set to a value satisfying the following expression (8)]

$$L \geq \frac{r * \tan\theta_m}{\operatorname{Sin}^{-1}(n * \cos\theta_m)} \quad (8)$$

A width W of electrode unit 107 (width of a lattice-shaped portion where the plurality of electrodes 106 is arranged) only needs to be set equal to or more than the beam width of the optical beam traveling through the electro-optic crystal. In FIG. 3B, when an optical beam before entry to the entrance surface of the electro-optic crystal has a beam diameter (diameter on the plane parallel to the arranging direction of the plurality of electrodes) l, the beam diameter of the optical beam in the electro-optic crystal is widened to l/cos θb. Thus, as shown in FIG. 3B, the width W of electrode unit 107 (width of the arranging direction of the plurality of electrodes) only needs to be set equal to or more than l/cos θb that is the beam width in the electro-optic crystal. Because of Brewster's angle θb=Tan$^{-1}$(n), the width W of electrode unit 107 needs to be set equal or more than l/cos(Tan−1(n)).

$$W \geq \frac{l}{\cos(\operatorname{Tan}^{-1}(n))} \quad (9)$$

It is desired that for electrodes 106, film thicknesses orthogonal to the arranging directions of electrodes 106 be as uniform as possible, and the intervals among electrodes 106 be as uniform as possible. Setting uniform thicknesses and intervals among electrodes 106 enables formation of relatively flat refractive index interface 202. Because of the relatively flat surface of refractive index interface 202, reflected light 103 travels almost in the same direction without being scattered. As a result, a reduction in extinction ratio caused by an influence of scattered light can be suppressed.

In the optical switch of the embodiment, designing an electrode length or the like based on a wavelength of light to be modulated enables reduction of the interelectrode capacity. For display use, particularly, visible light having a wavelength of 400 nanometers to 700 nanometers must be modulated. However, in such a wavelength region, a refractive index and a refractive index change amount of the electro-optic crystal vary slightly from one wavelength to another. For example, when potassium tantalate niobate (KTN) is used for the electro-optic crystal, based on a secondary electro-optic coefficient g11–g12, a vacuum dielectric constant $\in_0$, and a relative dielectric constant $\in_r$ of the electro-optic crystal, a refractive index n and a Kerr constant s can be calculated by the following expression (10) group:

$$\begin{cases} n^2 - 1 = \dfrac{3.7994}{1 - \left(\dfrac{0.2012}{\lambda}\right)^2} \\ s = (g11 - g12) \times \varepsilon_0^2 \times \varepsilon_r^2 \end{cases} \quad (10)$$

When a secondary electro-optic coefficient g11–g12 is 0.206 during use of light having a wavelength of 440 nanometers, by using the expression (10) group, the refractive index becomes 2.409, and the Kerr constant s becomes $4.67 \times 10^{-15}$. When a secondary electro-optic coefficient g11–g12 is 0.154 during use of light having a wavelength of 640 nanometers, by using the expression (10) group, the refractive index becomes 2.284, and the Kerr constant s becomes $3.49 \times 10^{-15}$.

When a voltage of 5V is applied between the electrodes where an interval is 5 micrometers, according to the expression (7), a refractive index change amount $\Delta n$ becomes −0.033 in the case of the light having the wavelength of 440 nanometers, and −0.021 in the case of the light having the wavelength of 640 nanometers. A critical angle $\theta m$ on the refractive index interface becomes, according to the expression (4), 80.6 degrees when the light having the wavelength of 440 nanometers is used, and 82.3 degrees when the light having the wavelength of 640 nanometers is used. As can be understood from these calculated values, the critical angle $\theta m$ changes depending on the wavelength to be used.

When a laser beam is used as incident light, a wavelength of light to be used is determined. Thus, based on a critical angle $\theta m$ obtained from the refractive index n and the refractive index change amount $\Delta n$ of the electro-optic crystal, and beam diameter r or beam diameter l of the laser beam, electrode length L and width W of the electrode unit are calculated by using expressions (8) and (9). Using the calculated electrode length L and the calculated width W of the electrode unit enables designing of the optical switch with a minimum necessary electrode length and a minimum necessary number of electrodes. As a result, the optical switch capable of reducing power consumption and performing high-speed modulation can be achieved.

When light such as white light having a relatively long wavelength is used as incident light, it is desired to change values of an incident angle of the incident light, an electrode length, and an applied voltage according to light of a long wavelength side where a refractive index change amount is relatively small.

Next, an electrode forming method for the optical switch of the embodiment is specifically described.

FIGS. 7A to 7H are sectional views showing steps of the electrode forming method for the optical switch.

Figure 7A:
FIG. 7A A sectional view showing a process for forming the electrodes in the optical switch according to the embodiment.
Figure 7B:
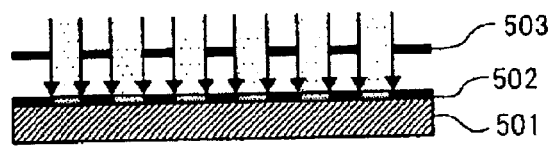
FIG. 7B A sectional view showing the process for forming the electrodes in the optical switch according to the embodiment.
Figure 7B:
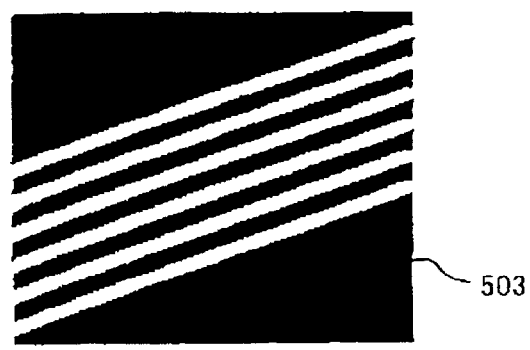
Figure 7C:
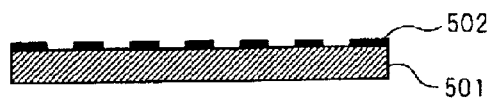
FIG. 7C A sectional view showing the process for forming the electrodes in the optical switch according to the embodiment.
Figure 7C:
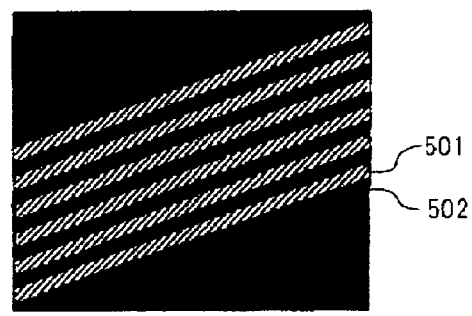

First, resist 502 is applied on a surface of electro-optic crystal 501 (step shown in FIG. 7A). Then, as shown in FIG. 7B0, mask 503 where electrode forming patterns are formed is used, the electrode forming patterns being arranged almost parallel to one another along a straight line inclined to an end surface at angles satisfying the expression (1) from the end surface (entrance surface) of the electro-optic crystal. By using mask 503, the surface on which resist 502 has been applied is masked to expose the applied surface of resist 502 (step shown in FIG. 7B). The exposed portion of resist 502 is removed (step shown in FIG. 7C). Thus, an electro-optic crystal having patterns shown in FIG. 7C0 is obtained.

Figure 7D:
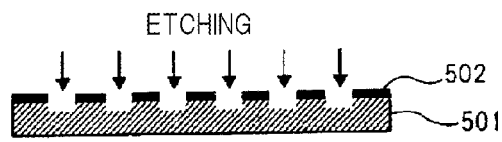
FIG. 7D A sectional view showing the process for forming the electrodes in the optical switch according to the embodiment.
Figure 7E:
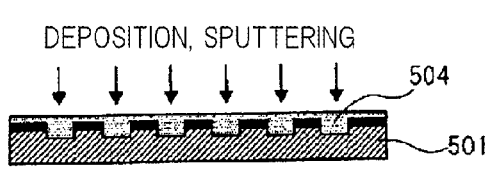
FIG. 7E A sectional view showing the process for forming the electrodes in the optical switch according to the embodiment.

Then, by using resist 502 having its exposed portion removed as a mask, an exposed surface of electro-optic crystal 501 is etched (step shown in FIG. 7D). As an etching material, for example, hydrogen fluoride is used.

Figure 7F:
FIG. 7F A sectional view showing the process for forming the electrodes in the optical switch according to the embodiment.

An electrode material (gold or platinum) is deposited on the entire surface of electro-optic crystal 501 where grooves have been formed by etching (step shown in FIG. 7F). Electrode 504 is formed by the electrode material deposited in the grooves of electro-optic crystal 504. Electrode 504 becomes electrode 106 shown in FIG. 3A. Then, resist 502 is removed from electro-optic crystal 501 (step shown in FIG. 7F).

Figure 7G:
FIG. 7G A sectional view showing the process for forming the electrodes in the optical switch according to the embodiment.

The surface of electro-optic crystal 501 and each surface of electrode 504 are sufficiently polished to form flat surfaces so that the surfaces can be equal in height, in other words, positioned on the same plane (step shown in FIG. 7G). Electro-optic crystal 104 shown in FIG. 3A is accordingly obtained.

Figure 7H:
FIG. 7H A sectional view showing the process for forming the electrodes in the optical switch according to the embodiment.

Lastly, under conditions of a high temperature and high pressure, the surface of electro-optic crystal 501 where electrode 504 has been formed is brought into close contact with the polished flat surface of other electro-optic crystal 505, and electro-optic crystals 501 and 505 are joined (step shown in FIG. 7H). Electro-optic crystals 501 and 505 can be bonded by using a binder or the like having a refractive index equal to those of the electro-optic crystals. It is presumed that in the joining step, the surfaces of electro-optical crystals 501 and 505 to be joined have been formed to be sufficiently flat.

Through the steps shown in FIGS. 7A to 7H, as shown in FIG. 3A, electrode 106 can be formed, and electro-optic crystals 104 and 105 can be joined.

Figure 8A:
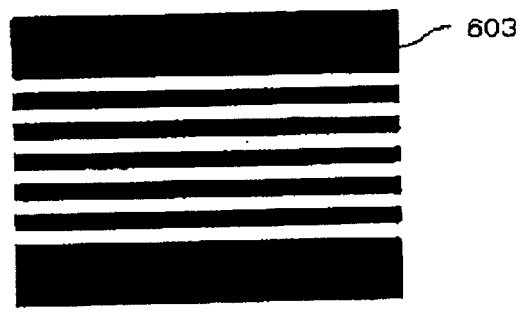
FIG. 8A A plan view showing a mask shape concerning another process for forming the electrodes in the optical switch according to the embodiment.

Next, another electrode forming method is described. According to this electrode forming method, after formation of resist 502 as shown in FIG. 7A, by using mask 603, a surface on which resist 602 has been applied is masked to expose an applied surface of resist 502 (step shown in FIG. 7B). In this case, as shown in FIG. 8A, mask 603 where electrode forming patterns are formed is used, the electrode forming patterns being arranged almost parallel to one another at angles almost vertical to the end surface of the electro-optic crystal.

Figure 8B:
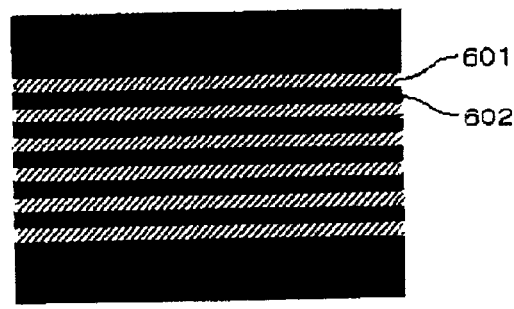
FIG. 8B A plan view showing a pattern formed by using the mask shown in FIG. 8A.
Figure 8C:
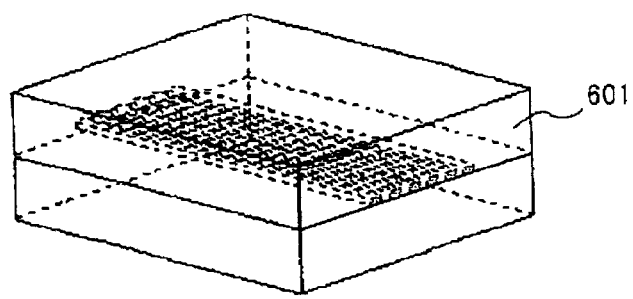
FIG. 8C A perspective view showing an outline of the joined electro-optic crystal.
Figure 8D:
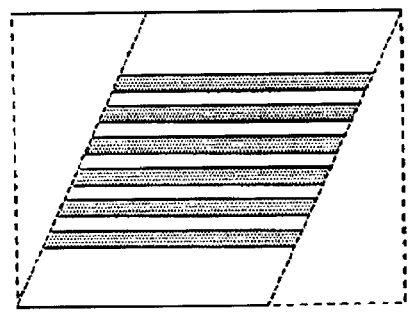
FIG. 8D A plan view showing a cut portion.

Then, an exposed portion of resist 602 is removed (step shown in FIG. 7C). An electro-optic crystal including resist 502 of patterns shown in FIG. 8B is accordingly obtained. Subsequently, the steps shown in FIGS. 7D to 7H are executed for the electro-optic crystal, thereby creating a structure shown in FIG. 8C. Then, by using this structure, as shown in FIG. 8D, both ends of the structure are scraped off in a direction inclined at a predetermined angle to the longitudinal direction of the electrode. Thus, a plurality of electrodes is formed, which extend in a direction inclined at an angle satisfying the expression (1) with respect to the end surface (entrance surface) of the electro-optic crystal and are arranged almost parallel to one another. The end surface of the electro-optic crystal is polished to be sufficiently flat, thereby manufacturing the optical switch of the embodiment.

Figure 9A:
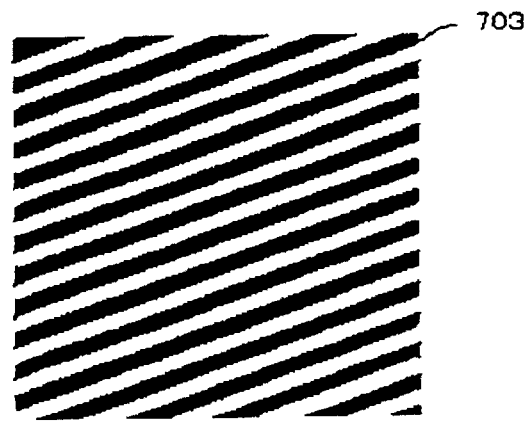
FIG. 9A A plan view showing a mask shape concerning yet another process for forming the electrodes in the optical switch according to the embodiment.

Next, yet another electrode forming method is described. This electrode forming method enables acquisition of a great many optical switches by one electrode forming operation. After application of resist 702 on relatively large electro-optic crystal substrate 701, by using mask 703, a surface on which resist 702 has been applied is masked to expose its applied surface (step shown in FIG. 7B). In this case, as shown in FIG. 9A, mask 703 where a plurality of electrode forming patterns is formed is used, the electrode forming patterns extending in a direction inclined at an angle satisfying the expression (1) with respect to the end surface (entrance surface) of electro-optic crystal 701 and being arranged almost parallel to one another.

Figure 9B:
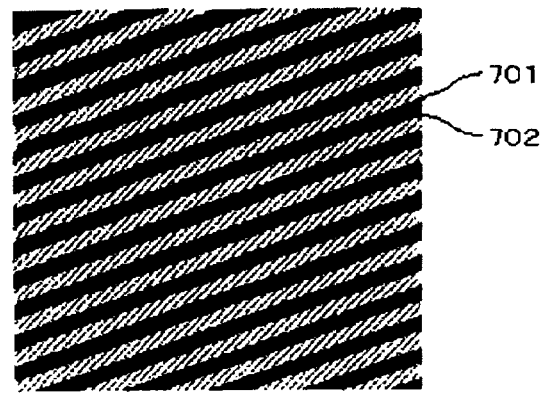
FIG. 9B A plan view showing a pattern formed by using the mask shown in FIG. 9A.
Figure 9C:
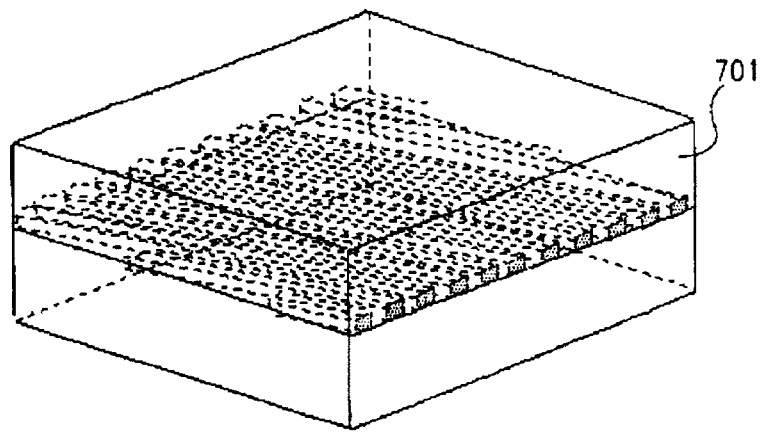
FIG. 9C A perspective view showing an outline of the joined electro-optic crystal.
Figure 9D:
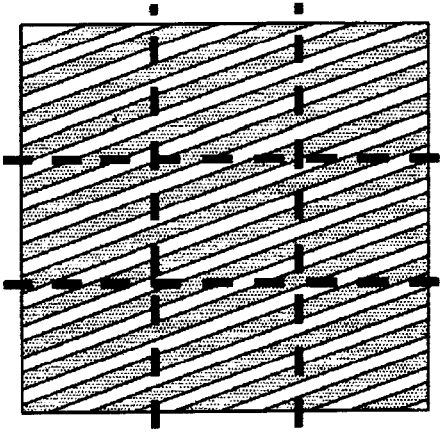
FIG. 9D A plan view showing a cut portion.

Then, an exposed portion of resist 702 is removed (step shown in FIG. 7C). An electro-optic crystal including resist 702 of patterns shown in FIG. 9B is accordingly obtained. Subsequently, the steps shown in FIGS. 7D to 7H are executed for the electro-optic crystal, thereby creating a structure shown in FIG. 9C. By further cutting the structure in a direction vertical to each end surface, and polishing each cut surface to be flat, a great many optical switches having electrode structures shown in FIG. 3A formed in the electro-optic crystal can be obtained at the same time.

Figure 10A:
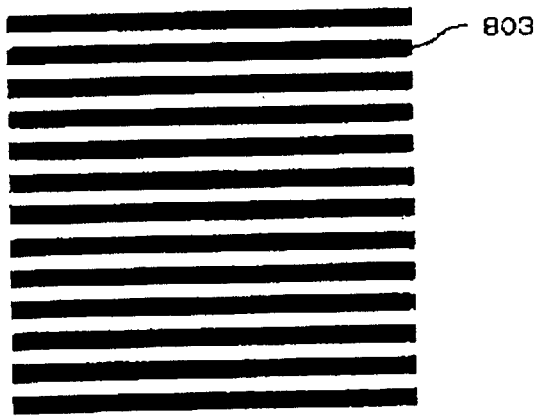
FIG. 10A A plan view showing a mask shape concerning yet another process for forming the electrodes in the optical switch according to the embodiment.

Next, yet another electrode forming method is described. This electrode forming method enables acquisition of a great many optical switches by one electrode forming operation. After application of resist 802 on relatively large electro-optic crystal substrate 801, by using mask 803, a surface on which resist 802 has been applied is masked to expose its applied surface (step shown in FIG. 7B). In this case, as shown in FIG. 10A, mask 803 where electrode forming patterns are formed is used, the electrode forming patterns extending in a direction at an angle vertical to the end surface (entrance surface) of electro-optic crystal 801 and being arranged almost parallel to one another.

Figure 10B:
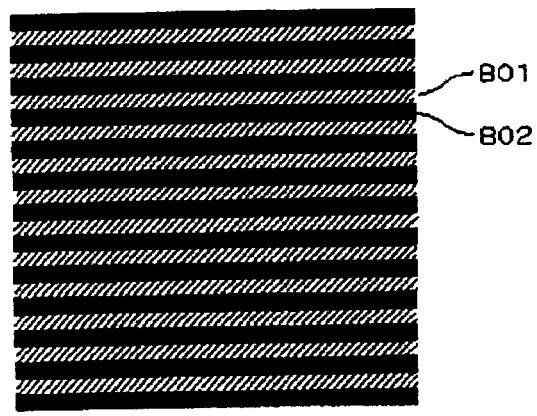
FIG. 10B A plan view showing a pattern formed by using the mask shown in FIG. 10A.
Figure 10C:
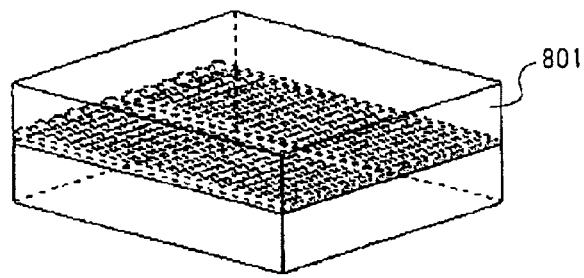
FIG. 10C A perspective view showing an outline of the joined electro-optic crystal.
Figure 10D:
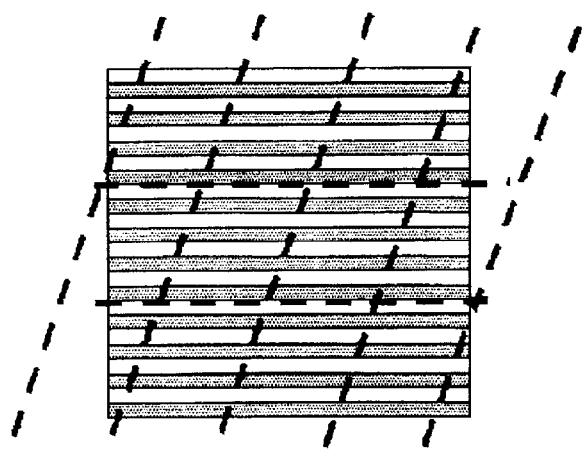
FIG. 10D A plan view showing a cut portion.

Then, an exposed portion of resist 802 is removed (step shown in FIG. 7C). An electro-optic crystal including resist 802 of patterns shown in FIG. 10B is accordingly obtained. Subsequently, the steps shown in FIGS. 7D to 7H are executed for the electro-optic crystal, thereby creating a structure shown in FIG. 10C. By using this structure, a portion shown in FIG. 10D is cut off from the structure, thereby creating a structure where a plurality of electrodes extending in a direction inclined at an angle satisfying the expression (1) with respect to the end surface (entrance surface) of the electro-optic crystal and arranged almost parallel to one another is formed. Then, by polishing the end surface so that it becomes sufficiently flat, a great many optical switches of the embodiment can be manufactured at the same time.

The optical switch of the embodiment can employ a multiple electrode structure that includes a plurality of electrode units arranged on an optical path in the electro-optic crystal. According to the multiple electrode structure, a high extinction ratio can be obtained.

In order to achieve a compact optical switch that can suppress light losses generated during entrance and exit of light in the end surface of the electro-optic crystal and obtain a high extinction ratio, it is desired to employ the multiple electrode structure.

Figure 11A:
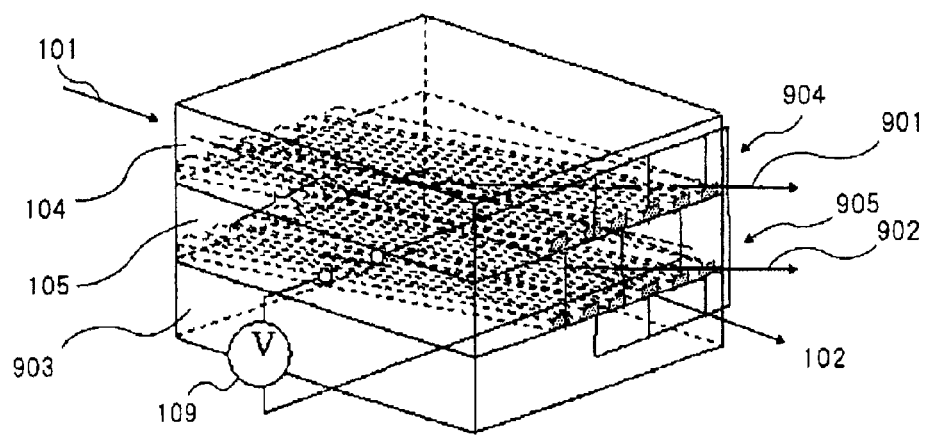
FIG. 11A A schematic view showing a multiple-electrode structure of an optical switch according to a modified example of the embodiment.
Figure 11B:
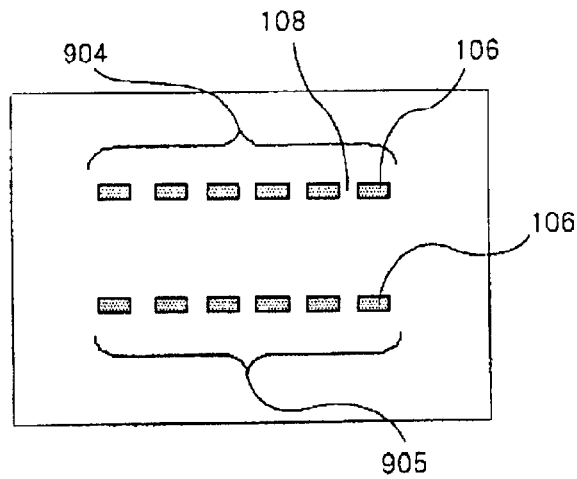
FIG. 11B A sectional view showing the optical switch on a plane almost orthogonal to a longitudinal direction of electrodes shown in FIG. 11A.

FIG. 11A is a schematic perspective view showing a configuration of an optical switch that has a multiple electrode structure. FIG. 11B is a sectional view on a plane almost orthogonal to a longitudinal direction of electrodes 106 formed in the optical switch shown in FIG. 11A.

As shown in FIG. 11A, the optical switch is configured by stacking and joining three electro-optic crystals 104, 105, and 903 under conditions of high temperature and high pressure. In the optical switch, refractive indexes are almost equal and continuous on respective joined boundary surfaces of electro-optic crystals 104, 105, and 903, and hence the crystals as a whole can be regarded as one optically uniform electro-optic crystal. Electro-optic crystals 104, 105, and 903 are crystals such as potassium tantalate niobate (KTN) or lithium niobate (LN) having an electro-optic effect.

Electro-optic crystal 104 includes electrode unit 904. Electrode unit 904 has the same electrode structure as that shown in FIG. 3A, including a plurality of electrodes 106. Electro-optic crystal 105 includes electrode unit 905. A structure of electrode unit 905 is similar to that of electrode 904.

A surface of electro-optic crystal 104 where electrode unit 904 is formed is joined to a surface opposite a surface of electro-optic crystal 105 where electrode unit 905 is formed. The surface of electro-optic crystal 105 where electrode unit 905 is formed is joined to a surface of electro-optic crystal 903. Electro-optic crystals 104, 105, and 903 are joined under conditions of a high temperature and high pressure. In place of such joining, electro-optic crystals 104, 105, and 903 can be bonded by using a binder or the like having a refractive index equal to those of electro-optic crystals 104, 105, and 903.

As shown in FIG. 11B, after joining of the electro-optic crystals, electrode units 904 and 905 are arranged so that arranging directions of pluralities of electrodes can be set parallel to each other. In a transmission direction of incident light 101 through electro-optic crystals 104, 105, and 903, each electrode of electrode unit 904 and each electrode of electrode unit 905 is arranged in positions opposite to each other.

Figure 11C:
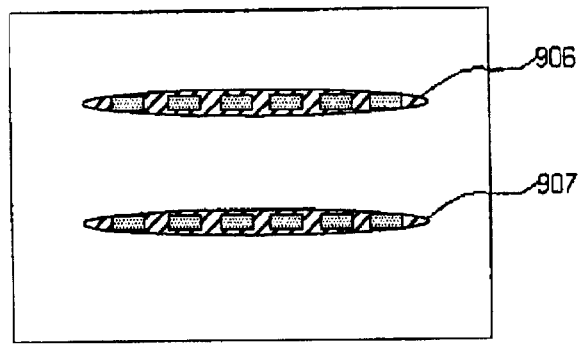
FIG. 11C A schematic view showing a refractive index change portion in the optical switch shown in FIG. 11A.

In the abovementioned optical switch having the multiple electrode structure, switching operations at electrode units 904 and 905 are almost similar to that at the electrode unit of the optical switch shown in FIG. 3A. When voltages are applied to electrode units 904 and 905, as shown in FIG. 11C, refractive index change portion 906 is formed in a crystal area near electrode unit 904, and refractive index change portion 907 is formed in a crystal area near electrode unit 605.

In a voltage applied state of electrode units 904 and 905, incident light 101 enters electro-optic crystal 104 while maintaining an incident angle equal to or more than a critical angle. Incident light 101 reaches refractive index change portion 906. At refractive index change portion 906, incident light 101 is divided into two light components, namely, a first transmitted light component and a first reflected light component. The first transmitted light component transmitted through refractive index change portion 906 reaches refractive index change portion 907 located at the rear of the optical path with respect to refractive index change portion 906. Then, at refractive index change portion 907, the first transmitted light component is further divided into two components, namely, a second transmitted light component and a second reflected light component. First reflected light 902 reflected at refractive index change portion 906 exits as reflected light 901 from an exit surface of electro-optic crystal 104 to the outside. Second transmitted light 102 transmitted through refractive index change portion 907 exits as transmitted light 102 from the exit surface of electro-optic crystal 104 to the outside.

When voltage that is supplied to electrode units 904 and 905 is stopped, refractive index change portions 906 and 907 are not formed, and hence incident light 101 is transmitted through light transmission unit 108 between electrodes included in electrode units 904 and 905. This transmitted light exits as transmitted light 102 from an exit surface of electro-optic crystal 903 to the outside. The exit direction of transmitted light 102 is different from those of abovementioned reflected lights 901 and 902.

As described above, in the voltage applied state of electrode units 904 and 905, light included in incident light 101, which has been transmitted through refractive index change portion 906 located at the front of the optical path, is reflected at refractive index change portion 907 located at the rear of the optical path. Thus, an extinction ratio can be increased.

When an incident angle, a beam diameter, and an interval between electrode unit 904 and electrode unit 905 are not appropriately set, second reflected light 902 from refractive index change portion 907 enters electrode unit 904, and adversely affects a switching operation, possibly causing reduction of the extinction ratio. In particular, when the interval between electrode unit 904 and electrode unit 905 is relatively narrow, due to the influence of mutual interferences of electric fields generated at electrode units 904 and 905, an unexpected refractive index change portion is formed between electrode unit 904 and electrode unit 905. In this case, an appropriate extinction ratio may not be obtained due to the influence of unexpected light scattering. It is therefore desired to set the interval between electrode unit 904 and electrode unit 905 such that no mutual interferences of electric fields occurs. Experimentally, it is desired to set the interval between electrode unit 904 and electrode unit 905 three times or more than an interval between the electrode arranging directions of electrode unit 904 and electrode unit 905.

Figure 12A:
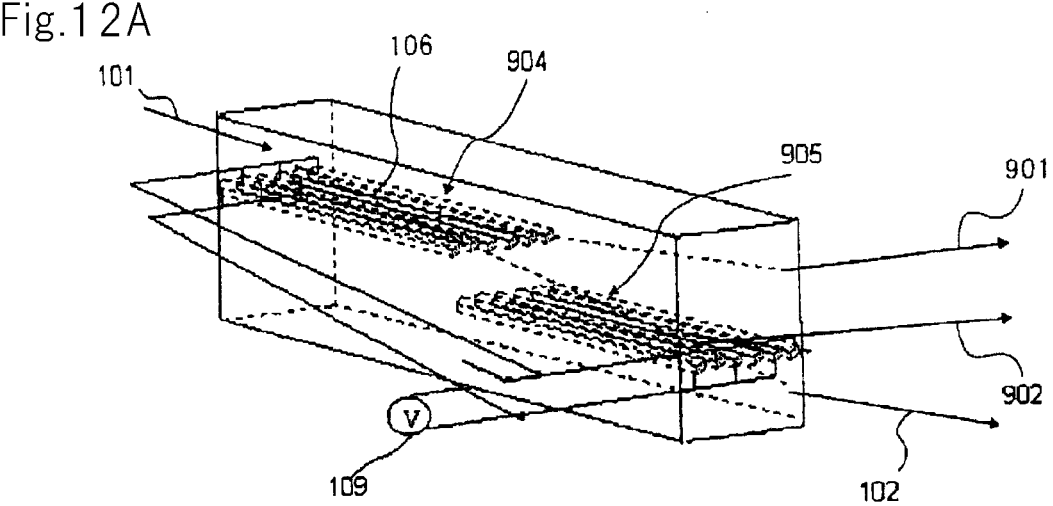
FIG. 12A A schematic view showing another multiple-electrode structure of the optical switch according to the modified example of the embodiment.
Figure 12B:
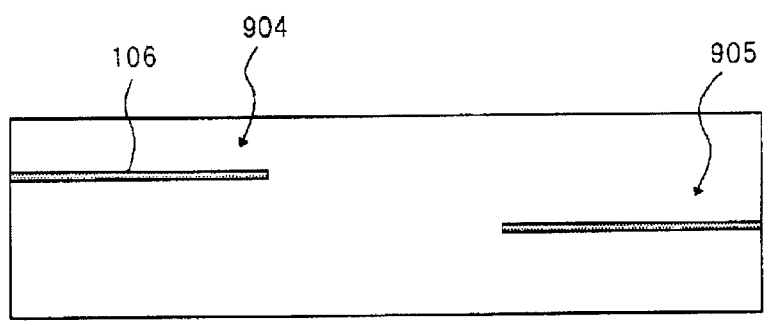
FIG. 12B A sectional view showing the optical switch on a plane including an axis parallel to the longitudinal direction of the electrodes shown in FIG. 12A.

As shown in FIGS. 12A and 12B, only on the optical path of incident light 101, can pluralities of electrode units 904 and 905 including electrodes of lengths equal to or more than the electrode length L shown in the expression (8) be arranged. FIG. 12B is a sectional view on a plane including an axis of the longitudinal direction of electrodes 106. In the case of this configuration, as in the abovementioned case, in a voltage applied state of electrode units 904 and 905, light included in incident light 101, which has been transmitted without being reflected at electrode unit 904 located at the front of the optical path, is reflected at electrode unit 905 located at the rear of the optical path. The extinction ratio can accordingly be increased. According to this configuration, by limiting an electrode forming area only to an area through which light is transmitted, the area of the electrodes and an area of the electro-optic crystal can be further reduced. As a result, compared with the structure shown in FIG. 11A, the interelectrode capacity can be reduced, power consumption can be reduced more, and a higher-speed operation can be achieved. The amounts of expensive electrode materials and electro-optic crystal materials that are used can be reduced, thereby lowering manufacturing costs.

In the optical switch having the multiple electrode structure shown in FIGS. 11A and 12A, when voltages are applied to electrode units 904 and 905, stray light is generated due to the scattering of light at each refractive index change portion. Because of the influence of the generated stray light, the appropriate extinction ratio may not be obtained. Thus, in the optical switch having the multiple electrode structure, light scattering must be suppressed as much as possible at the refractive index interface. To form the refractive index interface so that it is flat, as in the case of the optical switch having the one-stage electrode structure, the preferred way is to employ a structure where the plurality of electrodes included in the electrode unit are equal in height (position of a direction orthogonal to the arranging direction of the plurality of electrodes), film thickness (thickness in the direction orthogonal to the arranging direction of the plurality of electrodes), and electrode interval.

As shown in FIG. 11B, by positioning electrodes 106 of electrode units 904 and 905 during manufacturing, reflection of light at the electrode unit can be prevented. As a result, light utilization efficiency can be improved.

Figure 13A:
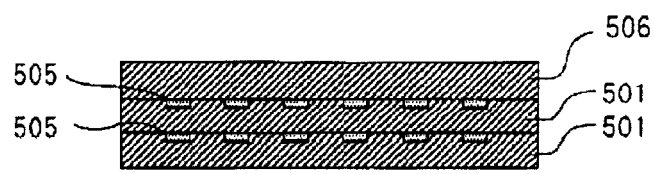
FIG. 13A A view showing a method for forming the multiple-electrode structure of the optical switch according to the modified example of the embodiment.

Next, a method for manufacturing the optical switch of the multiple electrode structure is described. First, through the process shown in FIGS. 7A to 7G, a plurality of electro-optic crystals 501 including electrode units each having a plurality of electrodes 106 is manufactured, and the plurality of electro-optic crystals 501 are joined. In the joined structure, one surface where the electrode unit of one electro-optic crystal is formed is joined to the other surface opposite the surface where the electrode unit of the electro-optic crystal is formed. Lastly, as shown in FIG. 13A, the structure where the plurality of electro-optic crystals 501 are joined is joined to a polished flat surface of another electro-optic crystal 506. By this manufacturing method, the optical switch of the embodiment shown in FIG. 11A or FIG. 12A can be manufactured.

Figure 13B:
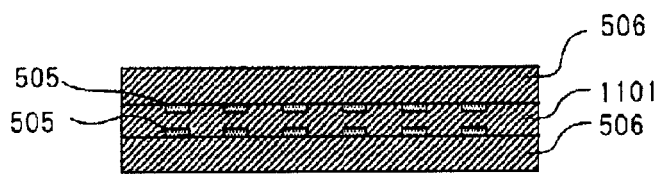
FIG. 13B A view showing a method for forming another multiple-electrode structure of the optical switch according to the modified example of the embodiment.

Next, another method for manufacturing the optical switch of the multiple electrode structure is described. First, through the process shown in FIGS. 7A to 7G, electro-optic crystal 501 including an electrode unit having a plurality of electrodes 106 is manufactured. On the backside of electro-optic crystal 501, similarly through the process shown in FIGS. 7A to 7G, an electrode unit including a plurality of electrode units 106 is formed. By using these manufacturing processes, one electro-optic crystal 1101 including two electrode units is manufactured. These two electrode units respectively become first and second electrode units 904 and 905. Lastly, as shown in FIG. 13B, a polished flat surface of another electro-optic crystal 506 is joined to both surfaces of electro-optic crystal 1101 including two electrode units 904 and 905. By this manufacturing method, the optical switch of the embodiment shown in FIG. 11A or FIG. 12A can be manufactured.

Next, an arrangement example when the optical switch of the embodiment is actually designed is described. In the embodiment, an arrangement example when potassium tantalate niobate (KTN) is used and an arrangement example when lithium niobate (LN) is used are described.

First, the case where potassium tantalate niobate (KTN) is used for an electro-optic crystal is described.

Concerning an optical beam of incident light, a beam width in a direction orthogonal to a plane (electrode surface) where a plurality of electrodes 106 is arranged is set to 20 micrometers, and a beam width in a direction parallel to the electrode surface is also set to 20 micrometers. A wavelength λ of the incident light is 640 nanometers. In this case, the refractive index of the potassium tantalate niobate (KTN) is 2.284.

An electrode unit must be set to a width W of about 50 micrometers, and hence there are ten electrodes 106 each having a width of 1 micrometer, and an interval x between electrodes 106 is set to 5 micrometers. Each electrode 106 is in contact with light transmission unit 108 having a depth orthogonal to the electrode surface set to 1 micrometer.

When a voltage of 5V is applied to the electrode unit by external power source 111, the refractive index change amount Δn is −0.0065. Under this condition, critical angle θm when the incident light is totally reflected at a refractive index interface of a refractive index change portion formed by electric field application is 85.7°. In this case, the incident angle of the incident light to the electro-optic crystal is 9.9°.

In order to totally reflect the incident light having a beam width (diameter) of 20 micrometers in the direction orthogonal to the electrode surface at the refractive index interface of the refractive index change portion, the length L of electrode 106 must be set equal to or more than 265 micrometers. In this case, a total interelectrode capacity of the electrode unit is about 405 picofarads.

In order to achieve the optical switch of the two-stage electrode structure, when the thickness of electro-optic crystal 105 is 20 micrometers, the interval between the two electrode units must be set to about 265 micrometers. Thus, the total length of the electro-optic crystal is equal to or more than 795 micrometers, and the thickness of the entire electro-optic crystal in the direction orthogonal to the electrode surface is equal to or more than 60 micrometers.

Next, the case where lithium niobate (LN) is used for an electro-optic crystal is described.

Concerning an optical beam of incident light, a beam width in a direction orthogonal to an electrode surface is set to 20 micrometers, and a beam width in a direction parallel to the electrode surface is also set to 20 micrometers. The wavelength $\lambda$ of the incident light is 640 nanometers. In this case, a refractive index of the lithium niobate (LN) is 2.284.

An electrode unit must be set to a width W of about 50 micrometers, and hence there are fourteen electrodes 106 each having a width of 1 micrometer, and an interval x between electrodes 106 is set to 3 micrometers. Each electrode 106 is in contact with light transmission unit 108 having a depth orthogonal to the electrode surface set to 1 micrometer.

When a voltage of 200V is applied to the electrode unit by external power source 111, a refractive index change amount $\Delta n$ is −0.0067. Under this condition, the critical angle $\theta m$ when the incident light is totally reflected at a refractive index interface of the refractive index change portion formed by electric field application is 85.6°. In this case, an incident angle of the incident light to the electro-optic crystal is 10.1°.

In order to totally reflect the incident light having the beam width (diameter) of 20 micrometers in the direction orthogonal to the electrode surface at the refractive index interface of the refractive index change portion, the length L of electrode 106 must be set equal to or more than 261 micrometers. In this case, the total interelectrode capacity of the electrode unit is about 1.63 picofarads.

In order to achieve the optical switch of the two-stage electrode structure, when a thickness of electro-optic crystal 105 is 20 micrometers, the interval between the two electrode units must be set to about 261 micrometers. Thus, the total length of the electro-optic crystal is equal to or more than 783 micrometers, and the height of the entire electro-optic crystal is equal to or more than 60 micrometers.

Each of the examples shown in FIGS. 11A and 12A is directed to the optical switch that includes the two electrode units arranged parallel to each other on the optical path. However, the number of electrode units is not limited to this configuration. Three or more electrode units can be included. With the increasing number of electrode units arranged parallel to one another in the traveling direction of the incident light, a higher extinction ratio can be obtained.

As described above, according to the embodiment, setting a relatively narrow interval between the electrodes of the electrode unit enables reduction of the interelectrode capacity, and acquisition of a large refractive index change by a low operating voltage. Thus, according to the embodiment, power consumption can be reduced. By providing the electrode unit that includes the plurality of electrodes, a switching operation can be performed for an optical beam having a relatively large diameter, for example, a beam diameter of several tens of micrometers to several hundreds of micrometers. The intensity of light applied per unit volume can accordingly be lowered, and high optical resistance can be achieved. According to the embodiment, the switching operation can be performed only by applying a voltage to the electrode unit, and hence the operation circuit can be simplified.

According to the embodiment, transmitting light at an angle parallel to the longitudinal direction of the electrodes in the electro-optic crystal enables entrance or exit of the light that satisfies the conditional expression of a Brewster's angle. According to the embodiment, without using any antireflection film, reflection generated during entrance or exit of the light can be suppressed. Moreover, according to the embodiment, the longitudinal direction of the electrodes and the traveling direction of the light can be set parallel to each other. As a result, reduction of light utilization efficiency caused by the thickness of the electrode can be suppressed, and high light utilization efficiency can be obtained.

In other words, the optical switch of the embodiment can obtain high optical resistance, and can be miniaturized. The structure of the operation circuit is simple. A switching operation can be performed with low power consumption for an optical beam having a relatively large beam diameter.

The optical switch of each embodiment can be applied to an optical communication device, an image display device, and an image forming device. Hereinafter, as application examples of the optical switch, an image display device and an image forming device are described.

[Image Display Device]

Figure 14:
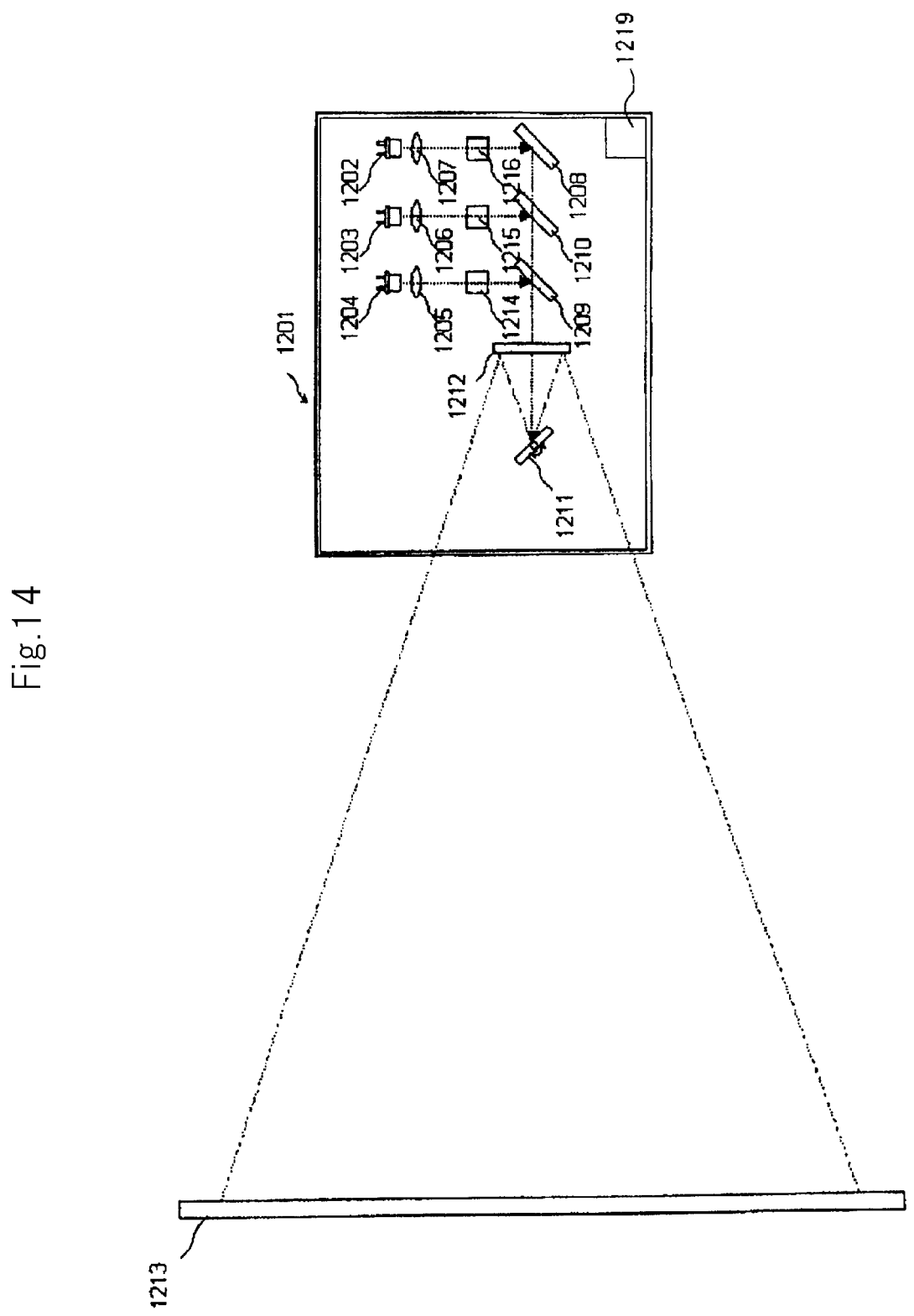
FIG. 14O A schematic view showing an example of an image display device that includes the optical switch of the embodiment.

FIG. 14 is a schematic view showing an example of an image display device that includes the optical switch of the present invention. As shown in FIG. 14, image display device 1201 includes laser light sources 1202 to 1204, collimator lenses 1205 to 1207, reflection mirror 1208, dichroic mirrors 1209 and 1210, horizontal scanning mirror 1211, vertical scanning mirror 1212, and optical switches 1214 to 1216. Optical switches 1214 to 1216 are the optical switches of the embodiments.

Collimator lens 1207, optical switch 1216, and reflection mirror 1208 are arranged in order in the traveling direction of a laser beam from laser light source 1202. Parallel light fluxes from collimator lens 1207 enter optical switch 1216. Optical switch 1216 operates according to a control signal supplied from control unit 1219. While the control signal is on (voltage supply period), voltage is applied to an electrode unit of optical switch 1216 to form a refractive index change area. Incident light is accordingly reflected by the refractive index change area. In this case, reflected light is shifted from an optical path toward reflection mirror 1208. While the control signal is off (voltage supply stop period), the incident light is transmitted through optical switch 1216 toward reflection mirror 1208.

Collimator lens 1206, optical switch 1215, and dichroic mirror 1210 are arranged in order on an optical path in a traveling direction of a laser beam from laser light source 1203. Parallel light fluxes from collimator lens 1206 enter optical switch 1215. Optical switch 1215 operates as in the case of optical switch 1216. While a control signal is on (voltage supply period), incident light is reflected by a refractive index change area. The reflected light is shifted from an optical path toward dichroic mirror 1210. While the control signal is off (voltage supply stop period), the incident light is transmitted through optical switch 1215 toward dichroic mirror 1210.

Collimator lens 1205, optical switch 1214, and dichroic mirror 1209 are arranged in order on an optical path in a traveling direction of a laser beam from laser light source 1204. Parallel light fluxes from collimator lens 1205 enter optical switch 1214. Optical switch 1214 operates as in the case of optical switch 1216. While a control signal is on (voltage supply period), incident light is reflected by a refractive index change area. The reflected light is shifted from an optical path toward dichroic mirror 1209. While the control signal is off (voltage supply stop period), the incident light is transmitted through optical switch 1214 toward dichroic mirror 1209.

Dichroic mirror 1210 is located at an intersection of a light flux from optical switch 1215 and a light flux reflected by reflection mirror 1208. Dichroic mirror 1210 has wavelength selection characteristics of reflecting light from optical switch 1215 and transmitting light from reflection minor 1208.

Dichroic mirror 1209 is located at an intersection of a light flux from optical switch 1214 and a light flux from dichroic mirror 1210. Dichroic mirror 1209 has wavelength selection characteristics of reflecting light from optical switch 1214 and transmitting light from dichroic mirror 1210.

Horizontal scanning minor 1211 is located in a traveling direction of the light flux from dichroic mirror 1209. An operation of horizontal scanning minor 1211 is controlled based on a horizontal scanning control signal from control unit 1219. Vertical scanning mirror 1212 is located in the traveling direction of a light flux from horizontal scanning minor 1211. The operation of vertical scanning minor 1212 is controlled based on a vertical scanning control signal from control unit 1219.

As laser light sources 1202, 1203, and 1204, light sources for emitting laser beams of colors corresponding to three primary colors of red (R), green (G), and blue (B) are used. By controlling optical switches 1214, 1215, and 1216 on and off, and controlling driving of horizontal scanning minor 1211 and vertical scanning mirror 1212, a color image can be displayed on screen 1213 that is an external projection surface.

[Image Forming Device]

Next, an image forming device according to an embodiment that includes the optical switch of the embodiment is described.

Figure 1A:
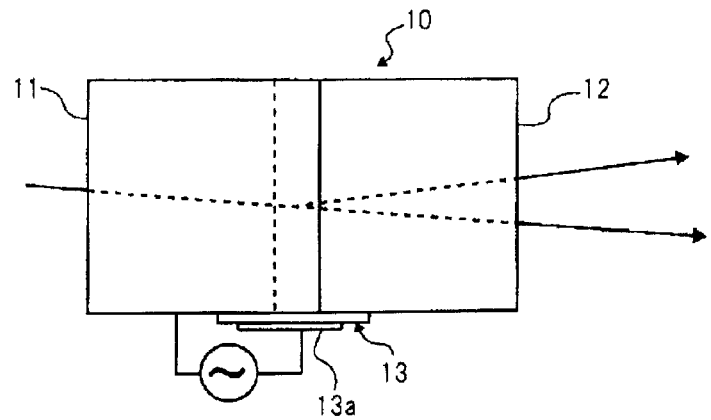
FIG. 1A A schematic view showing a configuration of an acousto-optic crystal described in Patent Literature 1.
Figure 1B:
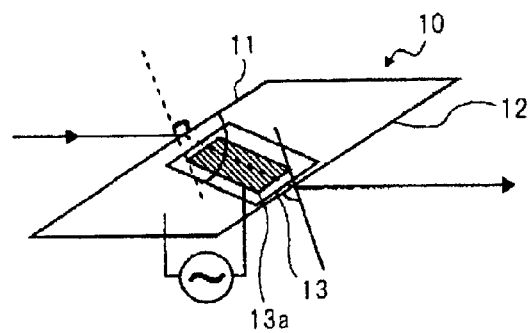
FIG. 1B A schematic view showing the configuration of the acousto-optic crystal described in Patent Literature 1.
Figure 2:
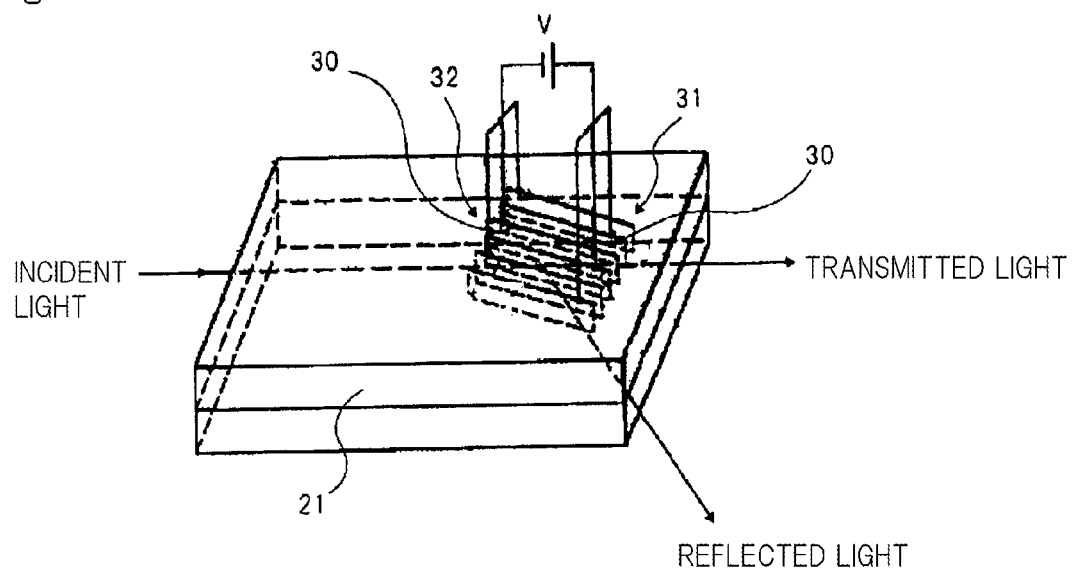
FIG. 2 A schematic view showing a configuration of an optical switch described in Patent Literature 2.
Figure 15:
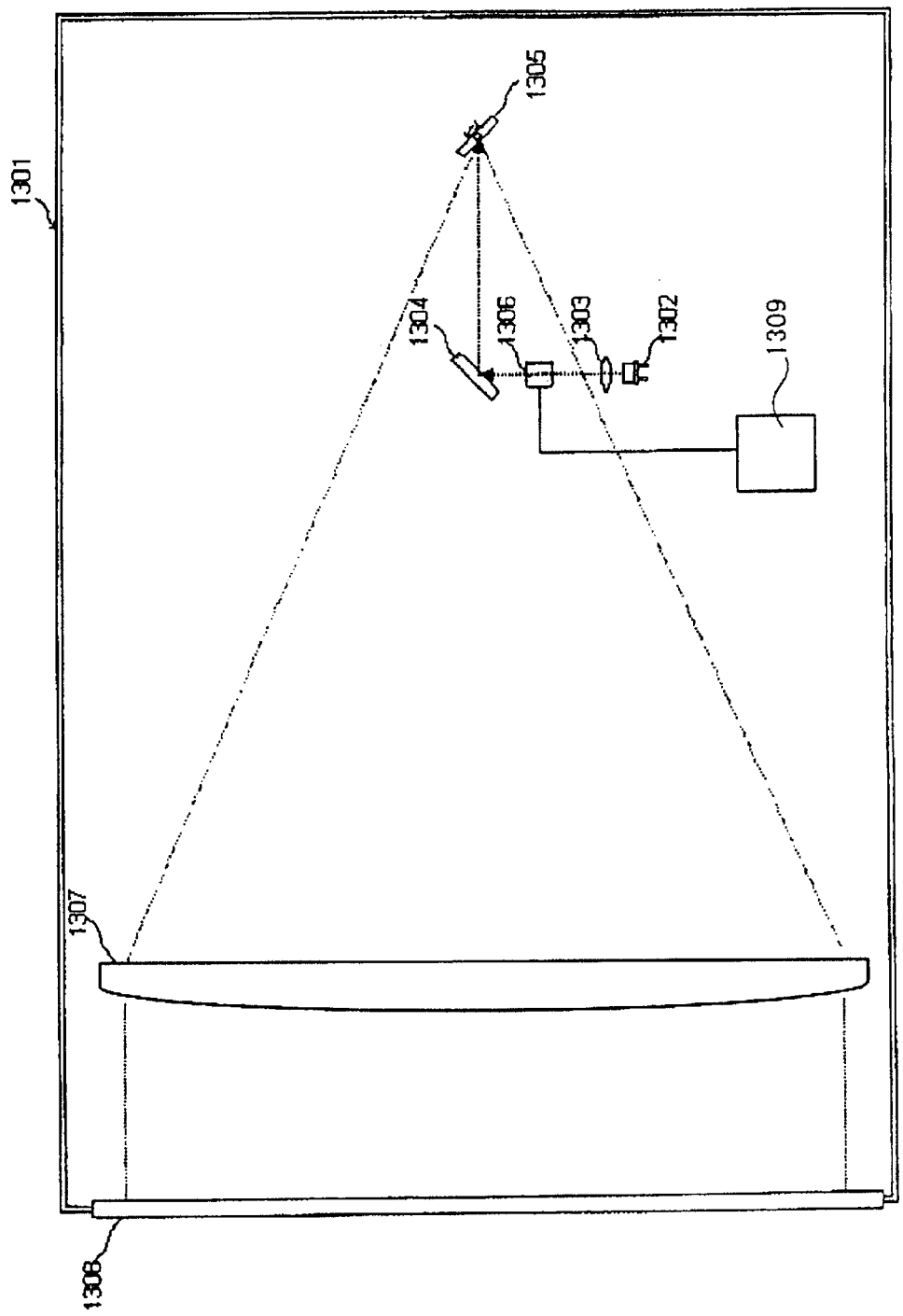
FIG. 15 A schematic view showing an example of an image forming device that includes the optical switch of the embodiment.

FIG. 15 is a schematic view showing an example of an image forming device that includes the optical switch of the embodiment. As shown in FIG. 1, image forming device 1301 includes laser light source 1302, collimator lens 1303, reflection minor 1304, scanning mirror 1305, optical switch 1306, fθ lens 1307, and photosensitive body 1308. Optical switch 1306 is the optical switch of the embodiment.

Collimator lens 1303, optical switch 1306, and reflection mirror 1304 are arranged in order on an optical path in the traveling direction of a laser beam from laser light source 1302. Parallel light fluxes from collimator lens 1303 enter optical switch 1306. Optical switch 1306 operates according to a control signal supplied from control unit 1309. While the control signal is on (voltage supply period), voltage is applied to an electrode unit of optical switch 1306 to form a refractive index change area. Incident light is accordingly reflected by the refractive index change area. The reflected light is shifted from an optical path toward reflection minor 1304. While the control signal is off (voltage supply stop period), the incident light is transmitted through optical switch 1306 toward reflection minor 1304.

Scanning mirror 1305 is located in the traveling direction of a light flux from reflection mirror 1304. An operation of scanning mirror 1305 is controlled based on a scanning control signal supplied from control unit 1309. Light from scanning minor 1305 is applied to photosensitive body 1308 via fθ lens 1307. If necessary, fθ lens 1308 can be omitted.

In the image forming device thus configured, optical switch 1306 is controlled on and off, and scanning minor 1305 is controlled to form an image on photosensitive body 1308.

The embodiment can be used as a device for directly projecting, without using fθ lens 1307 inserted immediately before photosensitive body 1308, a scanned image to photosensitive body 1308.

The embodiment has been directed to the configuration where the electrodes are formed to extend in the direction at the angle θx with respect to the entrance surface of the electro-optic crystal. Needless to say, however, a configuration where electrodes are formed to extend in a direction at an angle θx with respect to the exit surface of the electro-optic crystal can be employed.

The optical switch and the devices using the optical switch according to the embodiments of the present invention are only examples. The embodiments are therefore in no way limitative of the invention. Various changes understandable to those skilled in the art can be made of the configuration and the specifics of the present invention within the scope of the invention. In other words, the configuration and the optical switch manufacturing process according to the present invention can appropriately be changed without departing from the spirit and scope of the invention.

This application claims priority from Japanese Patent Application No. 2008-322726 filed Dec. 18, 2008, which is hereby incorporated by reference herein in its entirety.

| Explanation of Reference Numerals | |
|---|---|
| 101 | incident light |
| 102 | transmitted light |
| 103 | reflected light |
| 104, 105 | electro-optic crystal |
| 106 | electrode |
| 107 | electrode unit |
| 108 | light transmission unit |
| 201 | refractive index change unit |
| 202 | refractive index interface |

The invention claimed is:

1. An optical switch comprising:
an electro-optic crystal; and
an electrode unit including a plurality of electrodes arranged on the same plane in the electro-optic crystal to extend in parallel to one another,
a refractive index of a part of the electro-optic crystal being changed by an electric field generated at the electrode unit, thereby switching transmission and reflection of light incident on the electro-optic crystal,
wherein the electro-optic crystal has an entrance surface through which light enters and an exit surface from which light exits, the electrode unit being located between the entrance surface and the exit surface, and
an angle θx formed between a longitudinal direction of the electrodes and at least one surface from among the entrance surface and the exit surface is set near an angle that satisfies the following expression (1):

$$\theta x = 90° - \sin^{-1}[\cos(\tan^{-1}(n))] \quad (1)$$

(n denotes a refractive index of the electro-optic crystal in a wavelength of light to be modulated).

2. The optical switch according to claim 1, wherein the electrode unit has a principal section, whose area is the largest, located in the same plane of the electro-optic crystal.

3. The optical switch according to claim 2, wherein the plurality of electrodes are arranged with equal thicknesses in a direction orthogonal to the principal section and at equal intervals.

4. The optical switch according to claim 1,
wherein a refractive index change portion of the electro-optic crystal having a refractive index changed by an electric field generated at the electrode unit surrounds the entire electrode unit, and
a refractive index interface between a refractive index changed area of the refractive index change portion and an area around the refractive index changed area has a flat surface parallel to an arranging direction of the plurality of electrodes.

5. The optical switch according to claim 1, wherein a voltage is applied to the plurality of electrodes so that polarities of the adjacent electrodes can be different from each other.

6. The optical switch according to claim 1, wherein the light is inclined to enter the entrance surface by setting an angle θb formed between an optical axis of the light entering the entrance surface of the electro-optic crystal and a normal direction of the entrance surface near an angle that satisfies the following expression (3):

$$\theta b = \tan^{-1}(n) \quad (3)$$

(n denotes the refractive index of the electro-optic crystal in the wavelength of the light to be modulated).

7. The optical switch according to claim 1, wherein the incident light contains at least a P-polarized light component.

8. The optical switch according to claim 1, wherein in a refractive index interface between the area having a refractive index changed by the electric field generated at the electrode unit and the area around the area in the electro-optic crystal, length L of the electrode included in the electrode unit and width W of the electrode unit in the arranging direction of the plurality of electrodes respectively satisfy the following expressions (8) and (9), θm denoting a critical angle in total reflection, r denoting a beam diameter of the incident light on a plane orthogonal to the arranging direction of the plurality of electrodes and including an axis of the longitudinal direction of the electrodes, and l denoting a beam diameter of the incident light on the plane parallel to the arranging direction of the plurality of electrodes:

$$L \geq \frac{r * \tan\theta_m}{\sin^{-1}(n * \cos\theta_m)} \quad (8)$$

$$W \geq \frac{l}{\cos(\tan^{-1}(n))} \quad (9)$$

(n denotes the refractive index of the electro-optic crystal in the wavelength of the light to be modulated).

9. The optical switch according to claim 1, wherein a plurality of electrode units is located on an optical path through which the incident light is transmitted in the electro-optic crystal.

10. An image display device comprising:
a light source;
the optical switch according to claim 1;
scanning means for scanning an external projection surface with an optical beam modulated by the optical switch; and
a control unit for controlling a modulation operation of the optical switch based on a control signal input from the outside.

11. An image forming device comprising:
a light source;
a photosensitive body;
the optical switch according to claim 1;
scanning means for scanning the photosensitive body with an optical beam modulated by the optical switch; and
a control unit for controlling a modulation operation of the optical switch based on a control signal input from the outside.

12. A method for manufacturing an optical switch,
the optical switch including an electro-optic crystal, and an electrode unit having a plurality of electrodes arranged on the same plane in the electro-optic crystal to extend in parallel to one another, a refractive index of a part of the electro-optic crystal being changed by an electric field generated at the electrode unit, thereby switching transmission and reflection of light incident on the electro-optic crystal,
the method comprising the step of:
forming the plurality of electrodes on the same plane of the electro-optic crystal at an inclination by setting an angle θx formed between an end surface of the electro-optic crystal and a longitudinal direction of the electrodes near an angle that satisfies the following expression (1):

$$\theta x = 90° - \sin^{-1}[\cos(\tan^{-1}(n))] \quad (1)$$

(n denotes a refractive index of the electro-optic crystal in a wavelength of light to be modulated).

13. A method for manufacturing an optical switch,
the optical switch including an electro-optic crystal, and an electrode unit having a plurality of electrodes arranged on the same plane in the electro-optic crystal to extend in parallel to one another, a refractive index of a part of the electro-optic crystal being changed by an electric field generated at the electrode unit, thereby switching transmission and reflection of light incident on the electro-optic crystal,
the method comprising the steps of:
forming the plurality of electrodes on the same plane of the electro-optic crystal by setting a longitudinal direction of the electrodes orthogonal to an end surface of the electro-optic crystal; and
cutting the electro-optic crystal having the plurality of electrodes along a cut surface,
wherein in the cutting step, an angle θx of the cut surface to the longitudinal direction of the electrodes is set near an angle that satisfies the following expression (1):

$$\theta x = 90° - \sin^{-1}[\cos(\tan^{-1}(n))] \quad (1)$$

(n denotes a refractive index of the electro-optic crystal in a wavelength of light to be modulated).

14. The method for manufacturing an optical switch according claim 12, wherein in a refractive index interface between an area having a refractive index changed area by the electric field generated at the electrode unit and an area around the refractive index changed area in the electro-optic crystal, length L of the electrode included in the electrode unit and a width W of the electrode unit in an arranging direction of the plurality of electrodes respectively satisfy the following expressions (8) and (9), θm denoting a critical angle in total reflection, r denoting a beam diameter of the incident light on a plane orthogonal to the arranging direction of the plurality of electrodes and including an axis of the longitudinal direction of the electrodes, and l denoting a beam diameter of the incident light on the plane parallel to the arranging direction of the plurality of electrodes:

$$L \geq \frac{r * \tan\theta_m}{\sin^{-1}(n * \cos\theta_m)} \quad (8)$$

$$W \geq \frac{l}{\cos(\tan^{-1}(n))} \quad (9)$$

(n denotes the refractive index of the electro-optic crystal in the wavelength of the light to be modulated).

15. The optical switch according to claim 2,
wherein a refractive index change portion of the electro-optic crystal having a refractive index changed by an electric field generated at the electrode unit surrounds the entire electrode unit, and
a refractive index interface between a refractive index changed area of the refractive index change portion and an area around the refractive index changed area has a flat surface parallel to an arranging direction of the plurality of electrodes.

16. The optical switch according to claim 3,
wherein a refractive index change portion of the electro-optic crystal having a refractive index changed by an electric field generated at the electrode unit surrounds the entire electrode unit, and
a refractive index interface between a refractive index changed area of the refractive index change portion and an area around the refractive index changed area has a flat surface parallel to an arranging direction of the plurality of electrodes.

17. The optical switch according to claim 2, wherein a voltage is applied to the plurality of electrodes so that polarities of the adjacent electrodes can be different from each other.

18. The optical switch according to claim 3, wherein a voltage is applied to the plurality of electrodes so that polarities of the adjacent electrodes can be different from each other.

19. The optical switch according to claim 4, wherein a voltage is applied to the plurality of electrodes so that polarities of the adjacent electrodes can be different from each other.

20. The optical switch according to claim 2, wherein the light is inclined to enter the entrance surface by setting an angle θb formed between an optical axis of the light entering the entrance surface of the electro-optic crystal and a normal direction of the entrance surface near an angle that satisfies the following expression (3):

$$\theta b = \tan^{-1}(n) \quad (3)$$

(n denotes the refractive index of the electro-optic crystal in the wavelength of the light to be modulated).

* * * * *